US009076147B2

(12) United States Patent
Khoo et al.

(10) Patent No.: US 9,076,147 B2
(45) Date of Patent: Jul. 7, 2015

(54) SYSTEMS AND METHODS FOR ONLINE MARKETING AND ADVERTISING ON E-MAIL SYSTEMS

(75) Inventors: Justin Khoo, Milpitas, CA (US); Ying Xu, Foster City, CA (US)

(73) Assignee: Advenix, Corp., Milpitas, CA (US)

( * ) Notice: Subject to any disclaimer, the term of this patent is extended or adjusted under 35 U.S.C. 154(b) by 1860 days.

(21) Appl. No.: 11/581,980

(22) Filed: Oct. 17, 2006

(65) Prior Publication Data

US 2007/0038718 A1 Feb. 15, 2007

Related U.S. Application Data

(63) Continuation-in-part of application No. 10/667,103, filed on Sep. 17, 2003, now abandoned.

(60) Provisional application No. 60/411,836, filed on Sep. 18, 2002, provisional application No. 60/422,293, filed on Oct. 30, 2002, provisional application No. 60/457,407, filed on Mar. 25, 2003, provisional application No. 60/478,212, filed on Jun. 12, 2003, provisional application No. 60/480,076, filed on Jun. 20, 2003.

(51) Int. Cl.
*G06Q 10/10* (2012.01)
*H04L 12/58* (2006.01)
*G06Q 30/02* (2012.01)

(52) U.S. Cl.
CPC .............. *G06Q 30/02* (2013.01); *G06Q 10/107* (2013.01); *H04L 12/58* (2013.01); *H04L 12/581* (2013.01); *H04L 51/04* (2013.01)

(58) Field of Classification Search
CPC ..... G06Q 10/107; H04L 12/58; H04L 12/585; H04L 12/587; H04L 51/36
USPC .................................... 709/206, 216; 395/326
See application file for complete search history.

(56) References Cited

U.S. PATENT DOCUMENTS

| 5,307,086 | A | | 4/1994 | Griffin et al. | |
| 5,809,242 | A | * | 9/1998 | Shaw et al. | 709/217 |
| 5,835,084 | A | * | 11/1998 | Bailey et al. | 715/783 |
| 6,014,688 | A | | 1/2000 | Venkatraman et al. | |
| 6,134,566 | A | * | 10/2000 | Berman et al. | 715/205 |

(Continued)

OTHER PUBLICATIONS

Saunders, Christopher. "PointRoll to Launch 'Takeover'-Style Unit". ClickZ. http://www.clickz.com/showPage.html?page=996911, p. 1.

(Continued)

*Primary Examiner* — Asad Nawaz
*Assistant Examiner* — Jason Harley
(74) *Attorney, Agent, or Firm* — Barry N. Young

(57) ABSTRACT

Methods for enhancing e-mail messages to provide preview enhanced e-mail messages that allow e-mail senders to associate customized preview content related to an e-mail message, including graphical images, that can be viewed by recipients directly from an e-mail inbox listing without opening the e-mail message itself. The e-mail messages have associated preview instructions, and have a preview trigger that upon actuation opens a temporary preview window on the inbox view and displays the preview content in accordance with the preview instructions while the preview trigger is actuated. The invention is applicable to web-based e-mail systems as well as to POP-based and proprietary e-mail systems.

45 Claims, 19 Drawing Sheets

(56) References Cited

U.S. PATENT DOCUMENTS

| | | | |
|---|---|---|---|
| 6,304,897 B1 * | 10/2001 | Venkatraman et al. | 709/206 |
| 6,360,221 B1 | 3/2002 | Gough et al. | |
| 6,377,936 B1 | 4/2002 | Henrick et al. | |
| 6,434,607 B1 * | 8/2002 | Haverstock et al. | 709/217 |
| 6,449,634 B1 * | 9/2002 | Capiel | 709/206 |
| 6,516,341 B2 | 2/2003 | Shaw et al. | |
| 6,546,417 B1 * | 4/2003 | Baker | 709/206 |
| 6,633,850 B1 | 10/2003 | Gabbard et al. | |
| 6,654,725 B1 | 11/2003 | Langheinrich et al. | |
| 6,912,062 B2 * | 6/2005 | Kihara | 358/1.15 |
| 7,003,734 B1 | 2/2006 | Gardner et al. | |
| 7,047,502 B2 | 5/2006 | Petropoulos et al. | |
| 7,089,287 B2 * | 8/2006 | Bellotti et al. | 709/206 |
| 7,130,885 B2 | 10/2006 | Chandra et al. | |
| 2002/0004825 A1 | 1/2002 | Lindberg | |
| 2002/0033961 A1 * | 3/2002 | Murphy | 358/1.15 |
| 2003/0229893 A1 | 12/2003 | Sgaraglino | |

OTHER PUBLICATIONS

Ingebrigtsen, Lars Magne. "The Face Header". Quimby. http://quimby.gnus.org/circus/face/, p. 1.

\* cited by examiner

Fig. 7a

PREVIEW_TABLE

| Preview_ID |
|---|
| Vendor_ID |
| Preview_Type |
| URL |
| Tracking_Code |
| Dimensions |
| Max_Send |
| Num_viewed |
| Num_sent |
| Num_received |
| Num_loaded |
| Num_viewed |
| Num_clicked |
| Start_Date |
| End_Date |

Fig. 7b

TRANSACTION_TABLE

| Transaction_ID |
|---|
| Preview_ID |
| Affiliate_ID |
| Recipient_Email_Addr |
| Transaction_Type |
| Transaction_DateTime |
| Originator_IP |
| Browser_Type |

Fig. 7c

AFFILIATE_TABLE

| Affiliate_ID |
|---|
| Name |
| Domain_Name |
| Authentication_Info |

Fig. 7d

VENDOR_TABLE

| Vendor_ID |
|---|
| Name |
| Domain_Name |
| Authentication_Info |

Hotmail Interface
With MSN Featured Offers

Greenmail.com
Static graphical listing

Outlook
Static preview window

SYSTEMS AND METHODS FOR ONLINE MARKETING AND ADVERTISING ON E-MAIL SYSTEMS

CROSS-REFERENCE TO RELATED APPLICATIONS

This application is a continuation-in-part of U.S. application Ser. No. 10/667,103, filed Sep. 17, 2003, now abandoned which claims the benefit of: Provisional Application No. 60/411,836, filed Sep. 18, 2002; Provisional Application No. 60/422,293, filed Oct. 30, 2002; Provisional Application No. 60/457,407, filed Mar. 25, 2003; Provisional Application No. 60/478,212, filed Jun. 12, 2003; and Provisional Application No. 60/480,076, filed Jun. 20, 2003, the disclosures of which are all incorporated by reference herein.

BACKGROUND

The present invention relates generally to e-mail messages sent over a telecommunications network, and more specifically to the enhancement of e-mail messages to provide a preview mechanism, whereby senders of e-mail may provide special customized preview content, such as graphical messages in addition to the e-mail content.

E-mail is regarded as the Internet's first and one of its biggest applications. In 2000, International Data Corp. estimated that the average daily volume of e-mail around the world was about ten billion and will explode to thirty-five billion by 2005. Companies online and offline are finding that e-mails are a very effective and low-cost method to communicate with their customers. Unfortunately, unsolicited e-mail (SPAM or UCE) has become a big problem, and the pervasiveness of SPAM has diluted the power and effectiveness of e-mail as a means to attract, communicate with and keep customers.

Recipients of legitimate e-mail often find it difficult to sort through their e-mail messages and differentiate legitimate or commercial e-mail from e-mail that is SPAM or junk. The subject line often does not offer sufficient description of the content to adequately describe the e-mail or to entice the recipient to open it. As a result, many recipients routinely delete e-mails they are unable to identify, assuming the e-mails to be unwanted SPAM. This creates difficulties for legitimate commercial e-mail senders.

Existing e-mail implementations lack the flexibility of a creative and attractive physical "envelop" as afforded by postal mail to entice recipients to open or read the associated message. For example, envelopes of direct postal mail advertisers often contain colorful fonts and pictures to attract the user's curiosity, and catalogs also have attractive covers to give the recipients an indication of the contents. An e-mail with a subject line touting a sale on "Sears' Apostrophe" line may not mean much to recipients unfamiliar with the Apostrophe brand, whereas in a physical Sears' catalog examples of the Apostrophe line's products may be prominently displayed, prompting recipients to open and browse through the catalog.

There have been only a few examples of technology enhancements that help promotions stand out in the e-mail inbox of users. An enhancement might be in the form of a unique icon identifying the promotion as legitimate. FIG. 8a shows an example of an MSN Featured Offers promotions e-mail sent to users of Hotmail by partners of MSN. Certain promotional e-mails 803 may have a different icon than an ordinary e-mail 802. FIG. 8b shows an example of Greenmail.com where users are shown a small graphic 812 to entice the user to open the associated message. However Greenmail's promotional messages are not e-mail based. Users set up an account at Greenmail and advertising messages are inserted to the users' accounts by Greenmail. Also, Greenmail's static overlay graphical approach may clutter the listing of promotions in the user's promotional folder and limit the space on the screen for listing of messages.

Microsoft Outlook (FIG. 8c) has a static preview window 821 that shows a portion of the body of the e-mail, as shown in 821. However, this often does not help a recipient understand what the e-mail is about, especially if the body of the e-mail is large. The recipient may still be required to scroll in the preview window and scan the e-mail to understand its contents. Also, the Outlook preview window may limit the space allocated to the listing of an e-mail and make reading a long list of e-mail very tedious.

It is desirable to provide e-mail methods and systems that avoid the foregoing difficulties and address these and other known problems with current e-mail advertising approaches, and it is to these ends that the present invention is directed.

SUMMARY OF THE INVENTION

The present invention affords a method and system for enhancing electronic messages, such as e-mail, by providing a preview or "teaser" mechanism to enable temporary display of related preview content, served by a preview server, directly on an inbox listing of e-mails. The preview content may be displayed upon actuation of a preview trigger without the necessity of opening the associated e-mail message. The mechanism may be used with a web-based e-mail server or with an e-mail client.

The preview content may afford a visual and/or interactive electronic "envelope" for a message, instead of just text indicating the sender and subject line, to entice recipients to open the message. This envelope may comprise graphical and/or multi-media content designed to arouse interest in the e-mail by the recipient, and affords a customized preview of a sender's message that allows users to quickly browse the e-mail without having to open the message.

The invention enables viewing directly preview content associated with a particular electronic message on an aggregate inbox listing of messages, without opening the message itself, allowing the message sender to use creative content such as graphics, animation or multi-media in the preview to entice the user to access the message and any promotional material it contains.

In one aspect, the invention provides a method of enhancing electronic messages sent to an inbox listing of messages of a message receiving application. The message is provided with a preview trigger for actuating a temporary display, preview instructions, and associated preview content related to the e-mail message. Upon actuation of the preview trigger, a preview window is opened on the inbox listing, and the preview content is obtained and displayed within the preview window while the preview trigger is actuated in accordance with the preview instructions.

The preview instructions may obtain the preview content from a remote preview server, from an attachment to the message, or from the message itself. The preview instructions may be included in the message, for example, either in an e-mail header or as a MIME attachment in the message body. Instructions may also be obtained from a server.

In more specific aspects, the preview trigger may be in the form of an icon, for example, such that when a cursor is positioned over the preview trigger, the preview content will be loaded and displayed. Alternatively, the preview trigger may be within a header entry for the message on an inbox listing of messages.

The preview content may be loaded after the visible content of the listings are loaded to enable the page to look as if it has completed loaded earlier. The preview content, which may contain graphics and other audio or visual elements, may load in the background while the user is viewing the listing, as by using script code such as JavaScript that is loaded into a browser, server code, or a combination of both.

A delay may be introduced so that when a user initially moves a mouse cursor over the preview triggering mechanism, there is a time delay before actuating the display of the preview content to prevent accidental triggering. A delay may also be introduced after the user moves his mouse away from the triggering mechanism or preview content before hiding the preview content to allow the user some freedom in the movement of the cursor.

The preview window may afford multiple formats to show a preview. For example, the preview may be made to transition, e.g., slide down from under the message listing or progressively appear on the display.

In another aspect, the invention also provides a method uploading preview content and preview instructions to a first server related to an e-mail message for a recipient e-mail client. The preview content and preview instructions are associated with the e-mail message, and it is sent to the e-mail client. Upon actuating a preview trigger of an entry for said e-mail message on an inbox view listing of e-mail messages at said e-mail client, the preview instructions cause the email client to open temporarily, while the preview trigger is actuated, a preview window on the inbox view listing and to display the preview content within the preview window.

BRIEF DESCRIPTION OF THE DRAWINGS

FIG. 4, comprising FIG. 4a shows a process by which a preview-enhanced e-mail is created, sent and previewed by a user; FIGS. 4b, c illustrate embodiments of a process by which an advertiser uploads e-mail and preview content to e-mail and preview servers and readies campaigns for mailing; and FIG. 4d illustrates processes by which emails with preview content are sent by a mailing server and received by a destination server;

FIGS. 7a, 7b, 7c and 7d are diagrams showing preferred embodiments of the basic structures of some databases in accordance with the invention that may be maintained by the preview server;

DESCRIPTION OF THE PREFERRED EMBODIMENTS

The present invention relates to a method and system for enhancing electronic messages, such as e-mails, instant messages and RSS (Rich Site Summary) messages with preview or teaser mechanism that affords a preview of content related to the message that is served by a preview server. The preview mechanism may be resident on a web-based e-mail server or on a recipient's message client. A web-based e-mail server may run, for example, an open-source web-based e-mail message user agent (MUA), such as Horde's IMP and Oreilly's SquirrelMail running on a web server such as Apache, or an SMTP compliant e-mail message transfer agent (MTA) and delivery agent (MDA) such as Qmail. The preview server may be, for example, a merchant's Windows NT server. In the case of a non-web-based e-mail provider, the e-mail client may be Microsoft Outlook, for example.

While the invention has applicability to many different types of electronic messaging systems, it will be described primarily in the context of electronic mail (e-mail) messaging systems. It will be appreciated, however, that the invention has broader utility.

Figure 1A:
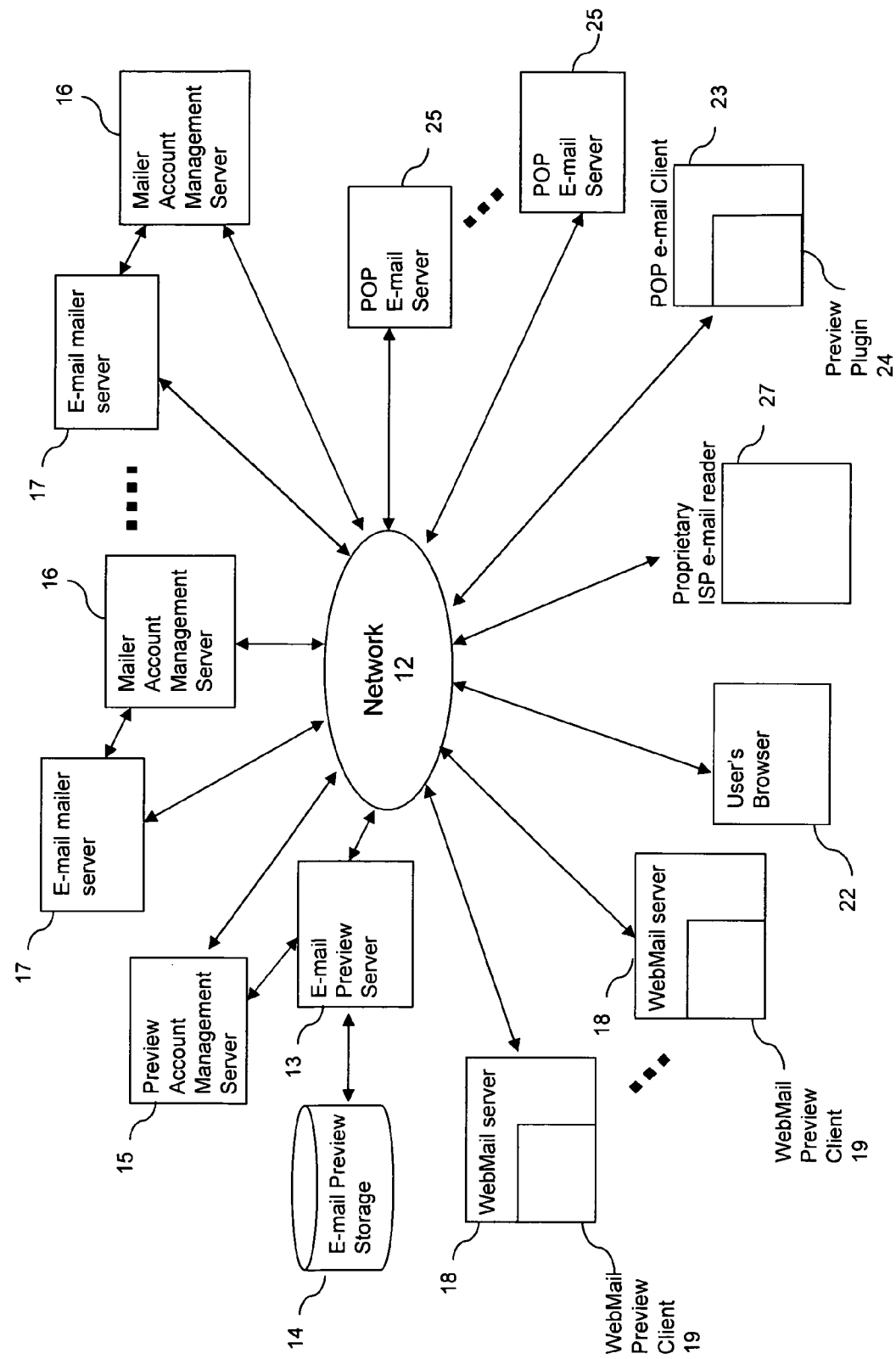
FIG. 1a is a diagrammatic view illustrating network of the type with which the invention may be employed for online direct marketing and advertising on e-mail systems.
Figure 9:
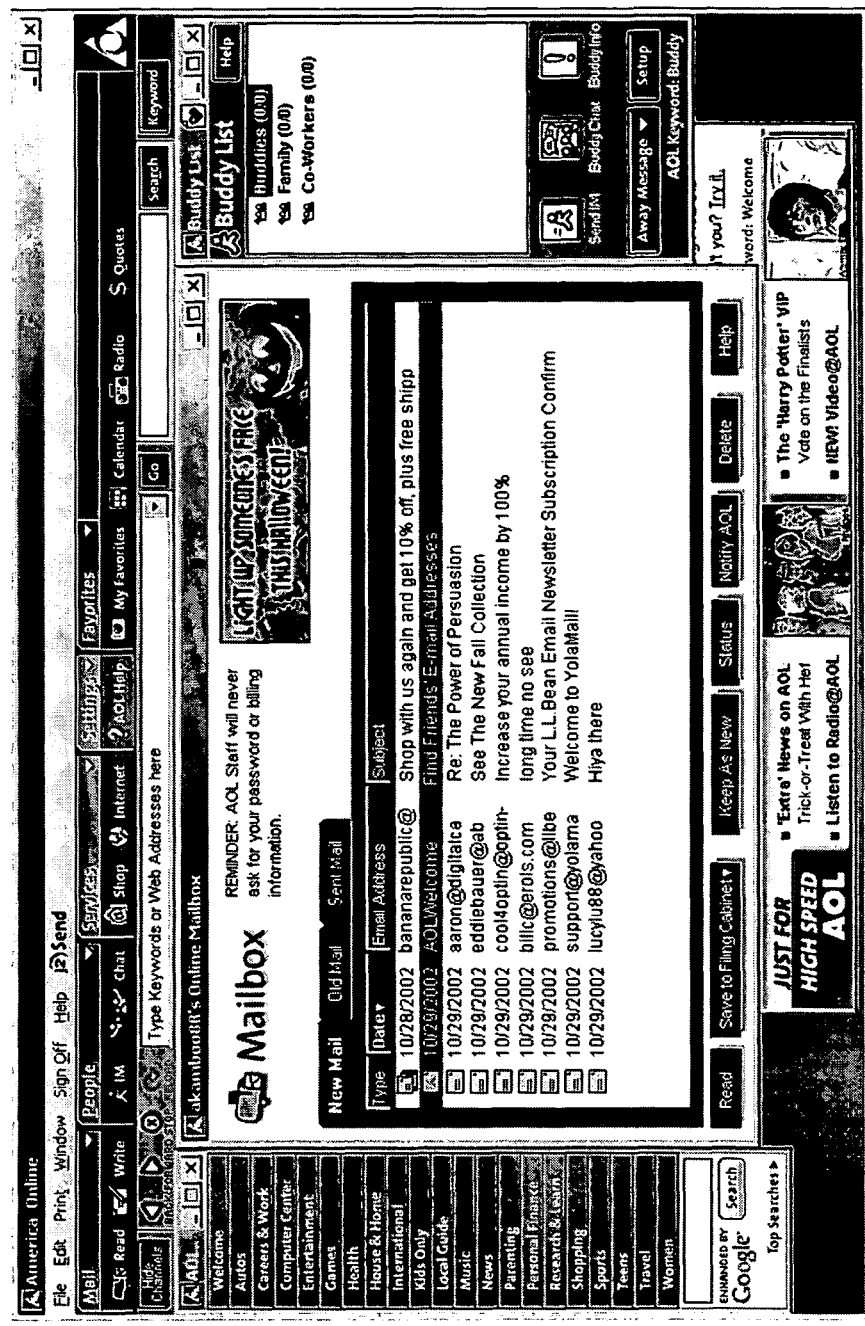
FIG. 9 shows a user interface of an AOL Internet client and its proprietary e-mail reader.

FIG. 1a shows a network 12 of the type with which the e-mail preview system and mechanism of the invention may be employed. The network, which may be the Internet, may comprises one or more vendor server systems comprising, for example, an electronic message preview server 13 connected to a preview storage 14, a preview account management server 15, a mailer account management server 16, and e-mail mailer server 17, and one or more affiliate web-based e-mail (web mail) servers 18, 20, and a user's browser 22. In an alternative embodiment comprising non-web-based e-mail service providers, the architecture may also include POP or IMAP (hereafter referred to only as POP) based e-mail servers 25 and a user's POP or IMAP e-mail client 23. Custom or proprietary e-mail readers 27 such as provided by AOL (FIG. 9), may also be included.

The preview account management server 15 may host an interface that allows e-mail senders to upload e-mail content to be served and may be connected to the e-mail preview server 13 which is responsible for serving the preview content. The preview account management server 15 and the e-mail preview server 13 server may be on the same machine.

The mailer account management server 16 may host an interface that allows e-mail senders to upload e-mail content to be mailed, and may be connected to the e-mail mailer server 17 which is responsible for the actual mailing of the e-mail. The mailer account management server 16 and the e-mail mailer 17 server may be on the same machine.

Each web-based e-mail server may include programs providing a client preview processes 19 that are responsible for integration and communication between the web mail servers 18 and the preview server 13. For a POP based e-mail service provider, a plug-in client process 24 may be integrated into the user's e-mail reader 23. In cases where the user accesses e-mail through a customized ISP interface 27, the interface may contain a client preview process.

The following description will focus on the web-based e-mail affiliate systems 13, 17 and 18 although, as will be apparent, the invention also applies to POP-based and proprietary ISP e-mail reader solutions.

Figure 1B:
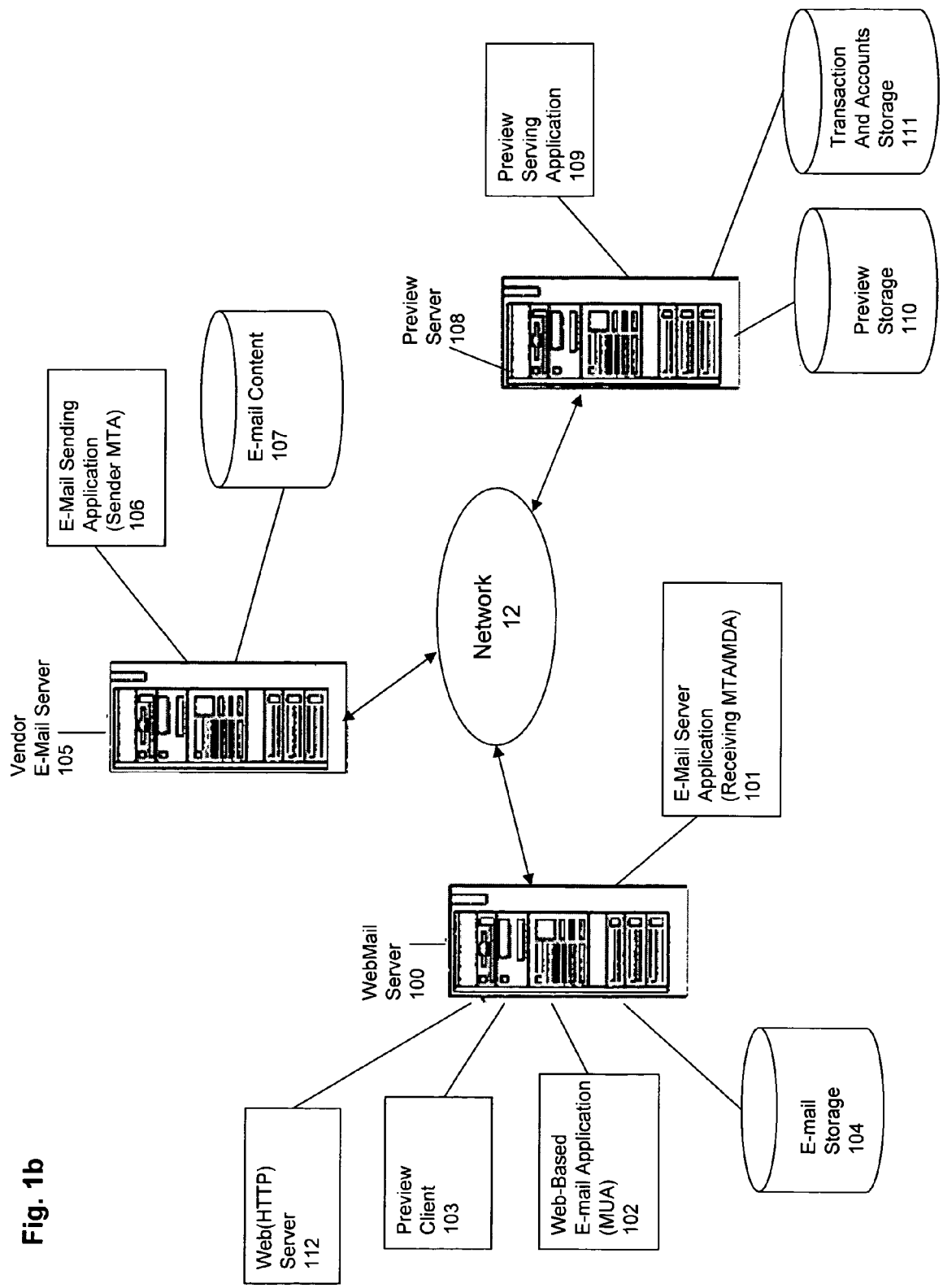
FIG. 1b is a diagrammatic view illustrating a web-based e-mail system and various applications and components that may be embodied in a network in which the invention may be used.

FIG. 1b shows in more detail a web-based e-mail system comprising various applications and components that may be included in the network. The system illustrated may comprise a web mail server 100, a vendor e-mail server 105, and a preview server 108. The web mail server 100 may comprise an affiliate e-mail server application 101, for example, a receiving message transfer agent (MTA) such as Qmail, an affiliate web-based e-mail application 102, for example, a web-based message user agent (MUA) such as the open source Horde project's IMP running on a web (HTTP) server 112 such as Apache, e-mail storage 104, and a preview client application 103. The preview client application may be a modification to the affiliate original web-based MUA 102.

The preview server 108 may comprise a preview serving application 109, preview storage 110, and storage 111 for transactions and account information. The vendor e-mail system 105 may comprise an e-mail sending application 106, such as a sender MTA, and a storage device 107 to store e-mail content before sending e-mails to recipients. The web mail server 100, vendor e-mail server 105, and the preview server 106, may be connected by a common network 12, such as the Internet. The preview server may store preview content and instructions for initializing the preview window and for downloading the preview content to the e-mail server or storage device.

E-mail sent from the vendor e-mail server 105 may be routed to the web mail server 100 using, for instance, transfer protocol (SMTP) protocol over TCP/IP. The user may read his e-mail in a web-based e-mail application 102 using a web browser 22 (FIG. 1a). The preview content may be retrieved from the preview server 108 using HTTP or other known protocols may be used, such as, FTP, streaming protocols, TCP and UDP.

E-Mail Preview

Figure 2A:
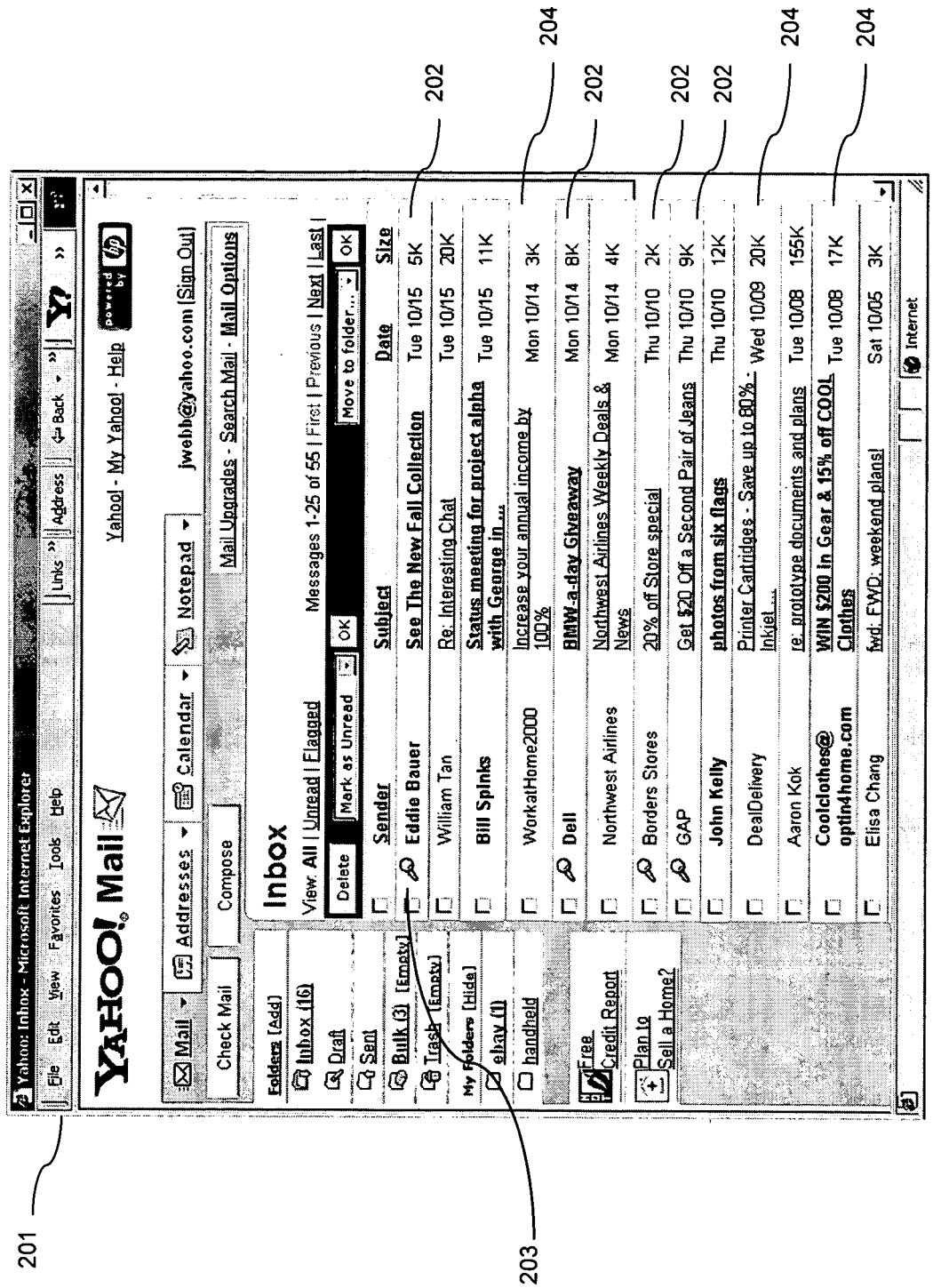
FIG. 2a is an example of a screen shot list of ordinary and preview-enhanced e-mail in accordance with the invention in the interface of a web-based e-mail provider.

FIG. 2a shows an example of a screen shot of an aggregate listing of messages in an inbox of a web-based e-mail client interface 201 that includes certain e-mails that have been preview-enabled in accordance with the invention. Preview-enabled e-mails 202 have associated preview content (also referred to herein as "teaser" content) and preview instructions that enable the preview content to be displayed to a user without opening the e-mail. These e-mails may be indicated by a preview trigger icon 203, for example, or some other visual indicator, signifying that a user may activate the preview content as by placing a mouse cursor over the icon 203. As will be described, the preview instructions may contain the necessary information to initialize and display temporarily a preview window on the inbox listing in which the preview content will be displayed. The preview instructions may also fetch and display the same or additional preview content. FIG. 2a also shows a plurality of e-mails 204 that do not contain preview instructions. These e-mails appear on the listing without a preview trigger icon 203. As usual, each e-mail may contain a link to the content of the e-mail itself.

Figure 2B:
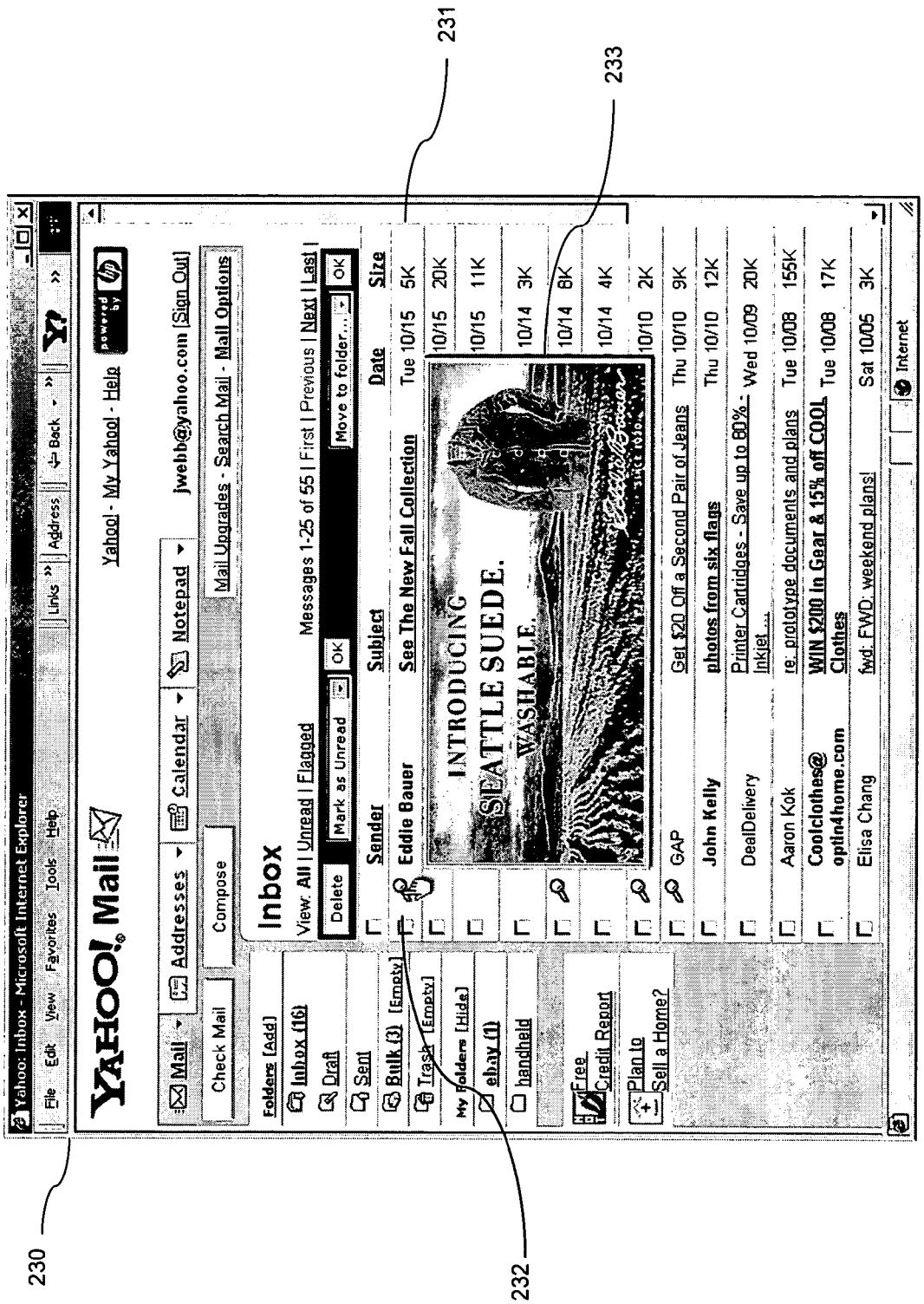
FIG. 2b is an example of the screen shot of FIG. 2a illustrating a preview triggered by hovering a mouse cursor over an icon that serves as a trigger mechanism.

FIG. 2b shows an example of a screen shot of a web-based e-mail user interface 230 that has a preview activated, as by the user placing his mouse cursor over a triggering icon 232 of an e-mail 231, and has the associated preview content 233 displayed. As will be appreciated, the preview trigger is not limited to a preview icon as shown, but may comprise a portion of or the entire e-mail entry on the listing, as well as other types of trigger mechanisms. Upon activating the preview trigger, the preview content 233 may appear to "transition" or slide out from under the listing entry 231, and may remain open in a preview window until either the user moves his mouse away from either or both the preview content 233 and the triggering icon 232. The previewing routine may be implemented as a DHTML layer controlled by JavaScript. Other methods that may be used include Macromedia Flash, Java or a proprietary plug-in, for example.

The preview content 233 may also appear on the display screen in different ways and by using different visual transition techniques, including animation. It may, for example, overlay the e-mail listing as shown, or it may push the e-mail listing down so as not to obscure the e-mails in the list. It may "slide out" from under the e-mail listing, simply appear on the listing or pop-out without a sliding effect, or it may transition across the page. It may also appear adjacent to the bottom of the listing 231. The preview content 233 may comprise graphical elements such as GIF and JPEG images, interactive rich media including audio, and video such as MacroMedia Flash, DHTML, Java applets, Windows media clips and any other such interactive media. The preview may also embed third party JavaScript, whereby clicking on the preview content 233 may either open the e-mail 231 itself, or take the user to a web-page resident on the Internet. If the preview content 233 includes interactive elements such as a HTML form or Macromedia Flash, the user may be able to dynamically interact with it through the activated preview window using a web application resident elsewhere on the Internet.

For example, a Macromedia Flash application can be loaded into the preview window which contains a plurality of visible controls for the viewing of a catalog of apparel. When the application loads in the preview window, initially a graphic is fetched from a remote server using the inbuilt functions available to the Flash application. The user is then able to interact with the controls to view more graphics within the catalog which would in turn fetch more graphics and or data from a remote server in real-time to display to the user within the preview window.

Applications such as ActiveX plug-ins can also be loaded within the preview window. Some of these applications may be in the form of a chat client which would allow the recipient to interact with a customer support personnel through a remote server using the preview window. Such an application would contain a field to enter text to be sent to the customer support personnel as well as a field that would display responses. This application would continue to run and allow for interaction with the remote server as long as the preview window is displayed.

The total payload of all the previews in a typical e-mail listing can be quite large, thus slowing down the overall loading of a page. This effect can be mitigated by ensuring that the initial loading of a page does not include the loading of the "heavy" objects in the preview content, such as graphics. One method to achieve this is to initially put in lightweight content or images in place of the heavyweight graphical preview content during initial loading of the page (in the HTML code), and then trigger the loading of the heavyweight graphical preview by JavaScript code after the page listing of e-mails has finished loading to the user's browser or application. The JavaScript code can load the heavyweight graphical previews from the preview server, and replace the lightweight content or images with the heavyweight content before a preview is shown. Another method to achieve a fast loading of the page is to activate loading of the heavyweight content only after the user has activated the preview trigger mechanism. This may result in the user being subjected to a delay in the loading of the preview, but this may be more acceptable than a larger delay to load the page with all of the content.

The preferred embodiment of the invention may further include a predictive loading algorithm that determines the order in which preview contents are loaded in the background. The algorithm may take into account any priority given to a promotion and the size of the preview content. In addition, the algorithm may load previews based on the real-time triggering pattern of the previews by the user, and may include the proximity of not-yet-loaded previews to previously viewed and loaded previews. An example would be when the user activates a preview trigger 232 (FIG. 2b) of an e-mail 231, any not yet loaded previews in close proximity to the triggered preview may be loaded in the background. The pre-loading of the preview content is independent of the generation of the preview window and may be initiated by a separate routine triggered, for example, when a page is loaded or by an onLoad( ) event of the page (in the case of web-based email).

The invention may also take advantage of the keep-alive feature of the HTTP protocol (persistent HTTP). A series of requests for content can be made on a single TCP/HTTP connection to the promotions server, which allows the content to be loaded faster. Other methods to achieve dynamic loading may include using technologies such as Flash, Java or other routines familiar to those skilled in the art, where the preview content may be streamed to the client giving the user an impression that the content is loading quickly.

In cases where the network is slow or there is considerable delay loading a preview after a user has activated the preview trigger, a routine may be executed to delay the appearance of any of the preview until the preview content has completely loaded. During this delay, an animation can be shown to signal to the user that the content is currently loading.

To prevent accidental triggering, delays may be introduced in a mouse-activated preview triggering mechanism 232 to ensure that the user has positioned the mouse cursor over the preview trigger for a specific period of time before the preview is actually triggered and shown to the user. This allows the user some leeway in movement of the mouse. A delay may also be introduced before an activated preview is hidden after the user has moved his mouse away from the preview trigger 232 or preview content layer 233.

Figure 2C:
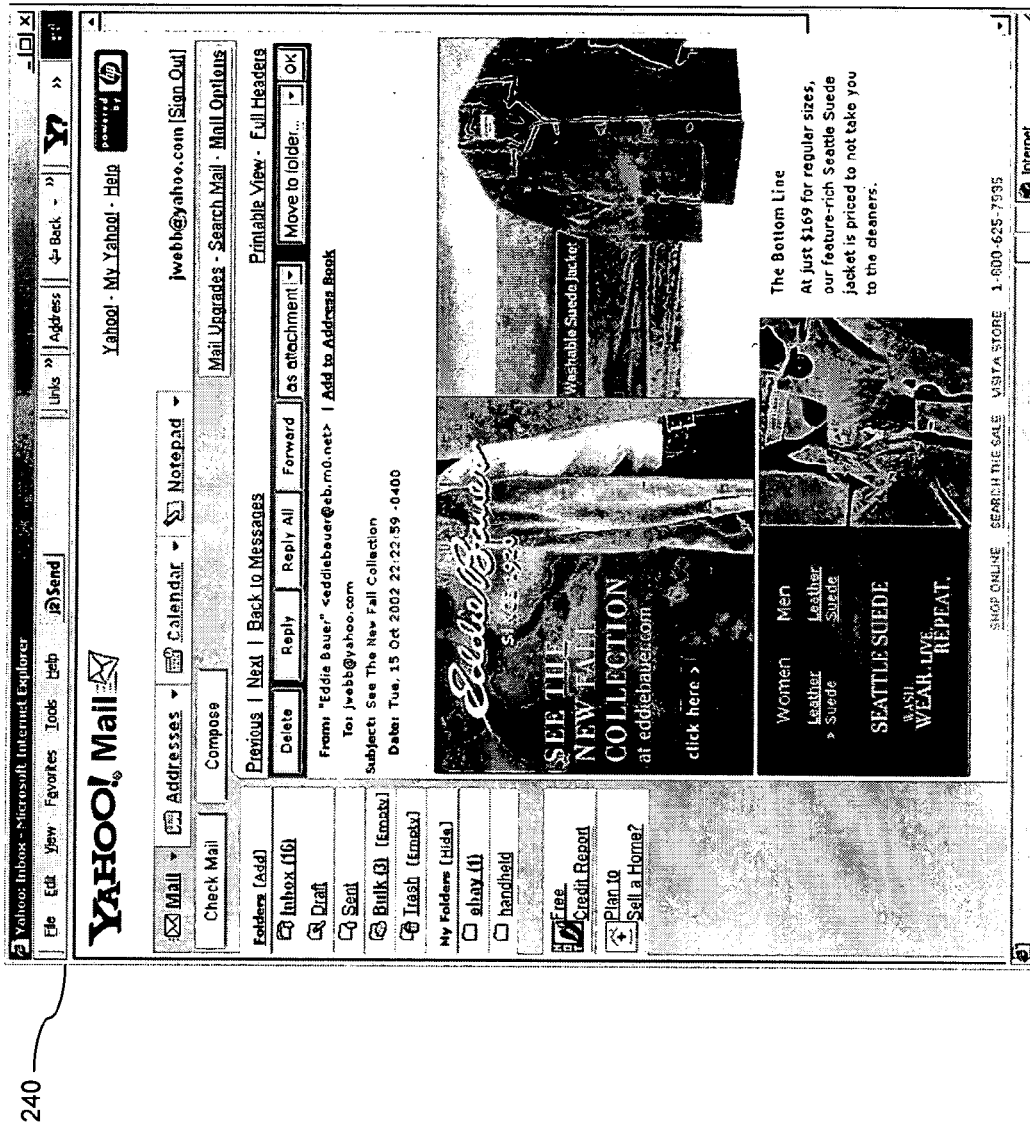
FIG. 2c is an example of a screen shot showing the contents of the opened preview-enhanced e-mail of FIG. 2b.

FIG. 2c shows an example of an opened e-mail preview window on a web-based e-mail provider's user interface 240.

Figure 2D:
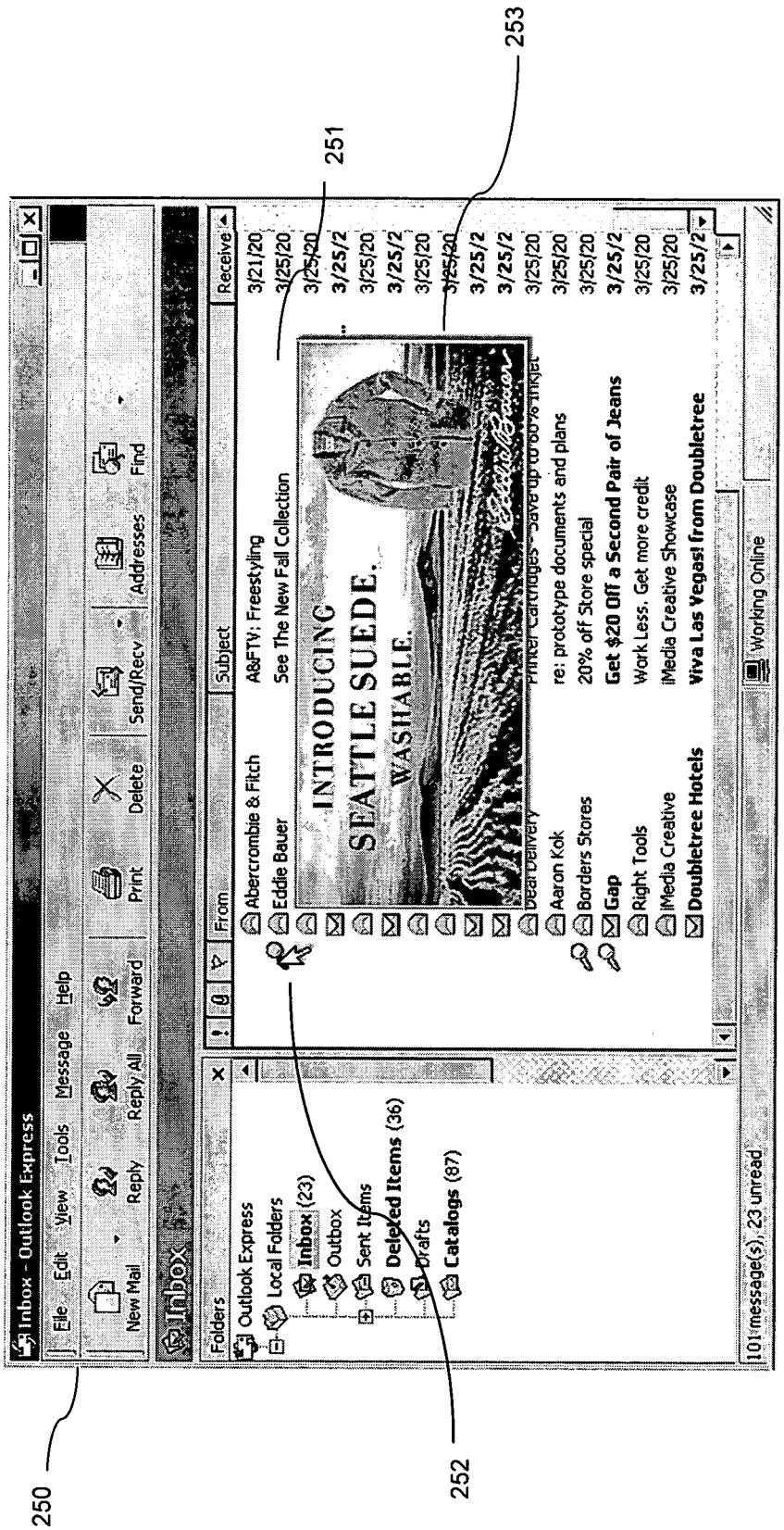
FIG. 2d is an example of a screen shot showing content of a preview-enhanced e-mail of an e-mail client in a stand-alone non-web browser-based application.

FIG. 2d shows an embodiment of the invention on a stand-alone e-mail application (not web browser-based), for example, on a Windows, Apple or UNIX based e-mail client that communicates with the e-mail server via POP, IMAP or a proprietary protocol. As with the web-based e-mail client application described above, the stand-alone e-mail client 250 interface may contain special preview enhanced messages 251 in a list of e-mail messages with special "trigger" icons 252 to allow a recipient to "mouse over" the icons to trigger and make visible preview content 253. The invention may allow for an additional routine of reading the content of the e-mail for preview instructions and showing the preview content on top of the e-mail listing.

E-Mail Preview Format

Figure 3A:
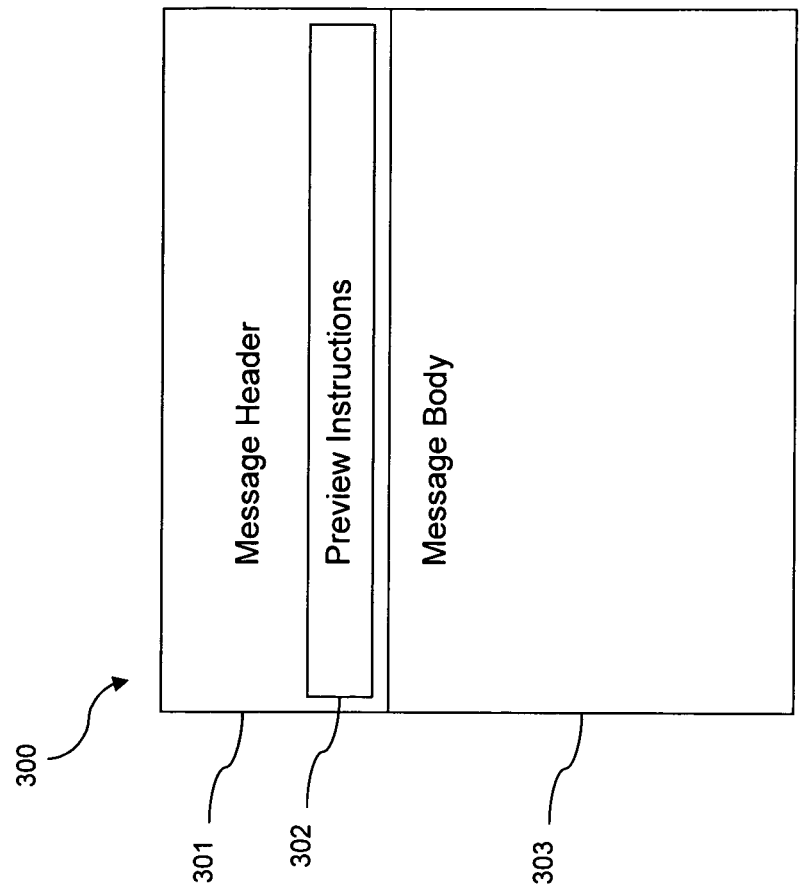
FIG. 3a is a diagrammatic view of an embodiment of a preview-enhanced e-mail format in which the preview instructions are included in the header of the e-mail.

FIG. 3a is a simplified diagrammatic view of an embodiment of an enhanced e-mail message preview format 300, where the preview instructions 302 are included in an e-mail message header 301. The preview instructions 302 may be, for instance, a user-defined header beginning with a predetermined character sequence, for example, an "X-". An example of a user-defined header in a preview-enhanced e-mail is as follows:

From: "Jane Sender" <jane@sender.com>
To: jwebb@yahoo.com
Bcc:
Subject: Sale on all leather jackets
Date: Sat, 26 Sep 2002 09:20:17 +0000
Mime-Version: 1.0
Content-Type: text/html
X-Preview: URL=http://previewserver.com/getpreview?preview_code=A3123G11&e-mail=jwebb@yahoo.com|TYPE=MacromediaFlash6.0|DIMENSION=480×200|PREVIEW_SCRIPT_VERSION=2.05

The preview instructions are included in the user-defined header "X-Preview:". In this example, the preview instructions include a URL of the remote preview content server 108 which serves the preview content 233, and the information needed to configure the preview viewing routines to display the preview. The recipient's e-mail address is preferably sent as an argument to the preview server to track that the recipient has indeed triggered the preview. Other more sophisticated methods, as well as privacy tracking methods may also be used to retrieve the preview, such as SSL, encoding or encrypting the e-mail address information, using a hash of the e-mail address, or other similar methods familiar to those skilled in the art.

In an alternate embodiment of the invention, instead of a URL, an ID may be used to uniquely identify the preview content. The preview server location that serves out the content may either be embedded as another parameter in the preview instructions or the server location may be obtained from a list or directory accessible by the application generating the e-mail listing. Furthermore, in yet another embodiment of the invention, instead of the location of the preview content being part of the preview instructions, the location of the preview server may be obtained from a list or directory accessible by the application generating the e-mail listing. A routine executing during the creation of the preview window, for instance, may combine elements such as the "preview code" from the preview instructions with the stored location of the preview server to form a URL, and use this to retrieve the content from the preview server. An example of the alternative preview instruction header is shown below:

X-Preview: PREVIEW_CODE=A3123G11|email=jwebb@yahoo.com|TYPE=MacromediaFlash6.0|DIMENSION=480×200|PREVIEW_SCRIPT_VERSION=2.05

Figure 3B:
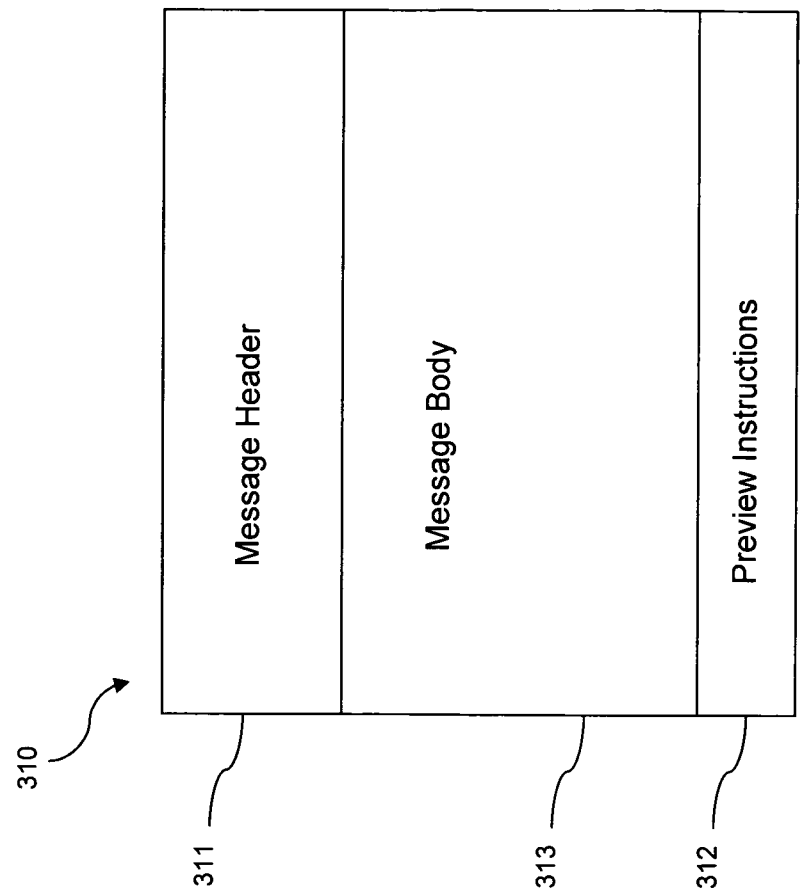
FIG. 3b is a diagrammatic view of an embodiment of a preview-enhanced e-mail format in which the preview instructions are included as an attachment in the body of the e-mail.

FIG. 3b shows an embodiment of the invention in which the preview instructions 312 are attached as a MIME attachment to the e-mail message 310. An example is:

From: "Jane Sender" <jane@sender.com>
To: jwebb@yahoo.com
Subject: Sale on all leather jackets
Date: Sat, 26 Oct 2002 09:20:17 +0000
MIME-Version: 1.0
Content-Type: multipart/mixed;

-continued

```
boundary="----=_NextPart_000_0036_01C26FEC.EE6C38B0"
This is a multi-part message in MIME format.
------=_NextPart_000_0036_01C26FEC.EE6C38B0
Content-Type: text/html;
Content-Transfer-Encoding: quoted-printable
<html>
<STRONG>
Hello Joe,
</STRONG><BR>
We are having a blowout leather jacket sale this weekend!<BR><BR>
<A href="http://sendersite.com/sale/">Click here</A> for more
information.<BR><BR>
See you soon!<BR>
Regards,<BR>
Jane Sender
</html>
------=_NextPart_000_0036_01C26FEC.EE6C38B0
Content-Type: application/x-preview;
Content-Transfer-Encoding: quoted-printable
URL: http://previewserver.com/getpreview?preview_code=-
    A3123G11&e-mail=jwebb@yahoo.com
TYPE: MacromediaFlash6.0
DIMENSION: 480x200
PREVIEW_SCRIPT_VERSION: 2.05
------=_NextPart_000_0036_01C26FEC.EE6C38B0--
```

In this example, the preview instructions are included as an attachment (multipart/mixed) of Content-Type "application/x-preview". The preview instructions may alternatively be encoded in an XML envelope to allow for easier manipulation by XML enabled parsers. Alternatively, the preview instructions may be a regular text attachment with a specialized file extension (such as .xpvw) to notify the receiving e-mail client to parse the file as one containing preview instructions. Another possible embodiment of a MIME "attachment" is to attach the preview instructions using a "MultipartRelated" or "Multipart/Alternative" encoding.

E-Mail Preview Process Overview

Figure 4A:
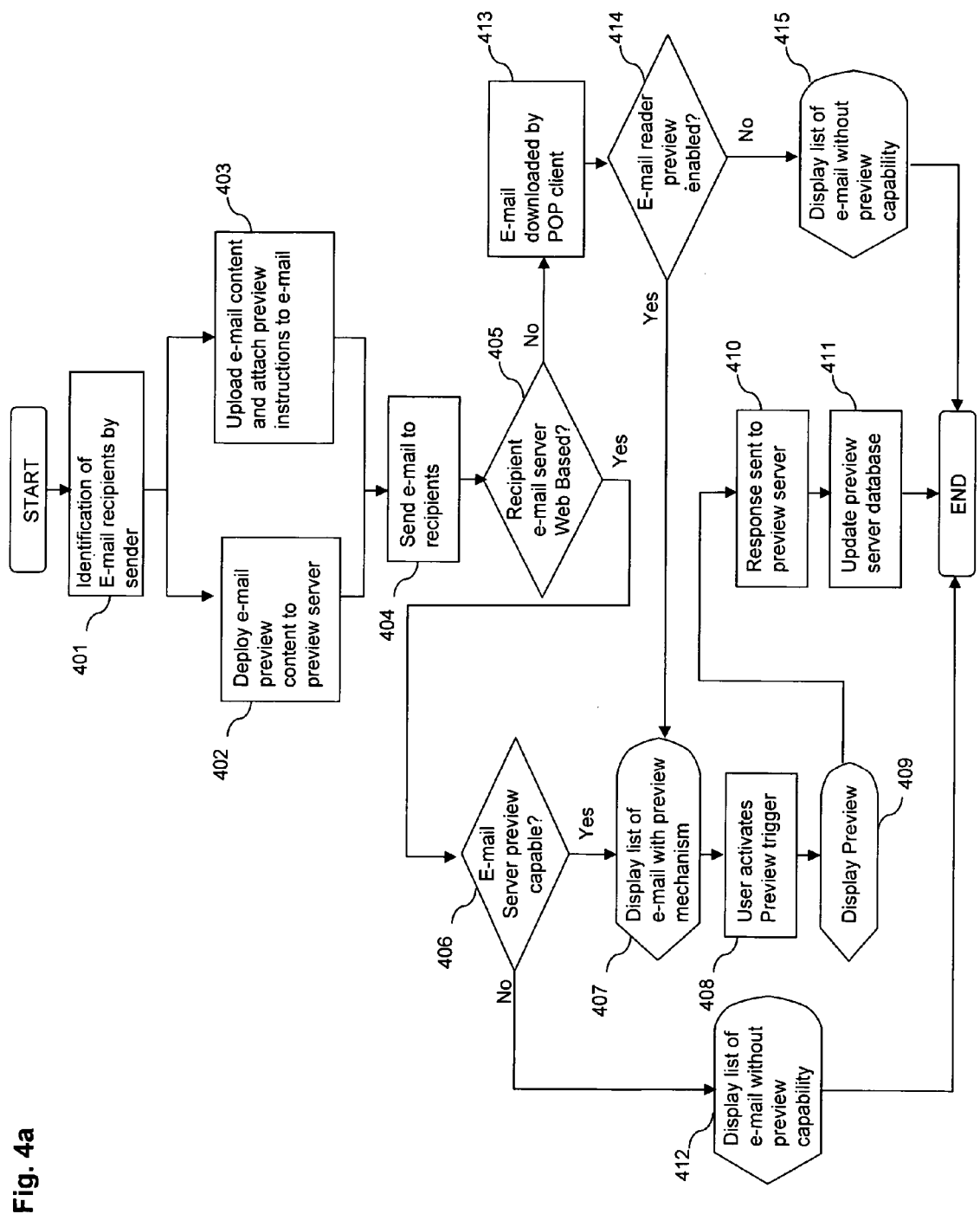
FIGS. 4a-4d, illustrates processes in accordance with the invention, where

FIG. 4, comprising FIGS. 4a-4d, are flow charts that illustrate preferred embodiments of processes of the invention. In FIG. 4a, which illustrates a process by which a preview-enabled e-mail is created and sent to recipients, a vendor may identify at 401 a list of e-mail recipients for the e-mail. The vendor may create both the e-mail content, and a graphical preview "envelope" content to go with the e-mail. The preview content may be deployed (at 402) to the preview server. Then, preview instructions may be attached (at 403) to each outgoing e-mail using a customized message user agent (e.g., e-mail composer tool) which includes the preview instructions as part of the e-mail header. The e-mails may be then sent (at 404) to the recipients by a message transfer agent (outbound e-mail server). The process then may determine at 405 if the recipient's e-mail service provider is web-based, such as Hotmail, and determine at 406 whether the service provider is capable of processing preview instructions in e-mail. If so, a list of e-mails with preview triggering mechanisms may be generated and displayed at 407 to the user, as shown in FIG. 2a. If the web-based e-mail service provider's software is not capable of processing preview instructions in e-mail, then the preview enabled e-mail listing may still be displayed at 412, but as shown in FIG. 2a, the listing will not have any preview mechanisms or icons 203.

If at 405 the recipient's e-mail service provider is not web-based, but rather POP based, and if the user's e-mail reader is capable of processing preview instructions in e-mail (414), then a list of e-mails with preview triggering mechanisms may be generated and displayed at 407 to the user. If the e-mail reader software is not capable of processing preview instructions in e-mail, then the preview enabled e-mail may still be listed (at 415), but the listing will not have any preview triggering mechanisms or icons 203.

In a further embodiment of the invention not shown in FIG. 4, where the recipient receives e-mail on a proprietary customized e-mail client reader, such as AOL (see FIG. 9), a listing with preview mechanisms may be shown if the e-mail reader contains program routines capable of processing preview instructions in e-mail.

E-Mail and Preview Upload Process

As shown in FIG. 4a, the process of sending the preview enhanced e-mail may involve uploading the preview content at 402 to the preview server, uploading e-mail content at 403 to an e-mail server, inserting the preview instructions in the e-mail, and then sending the e-mail. However in certain cases the preview server and e-mail server may be managed by completely different systems. Accordingly, a process may be used to manage coordinating the preview information between both systems. The process may comprise mechanisms to integrate the process of uploading the preview content to a preview content server, retrieving preview instructions from the preview content server, and embedding the instructions in the e-mail on servers at e-mail servers before the e-mail is sent to the recipients.

The foregoing description made reference to elements illustrated in FIG. 1 such as the preview account management server 15 and the mailer account management server 16. These servers may run applications that manage the content of the preview content and e-mail content, respectively, and deploy the content to the e-mail preview server 13 and e-mail mailer server 17. This assumes that the advertiser or user already has accounts at both these servers.

Figure 4B:
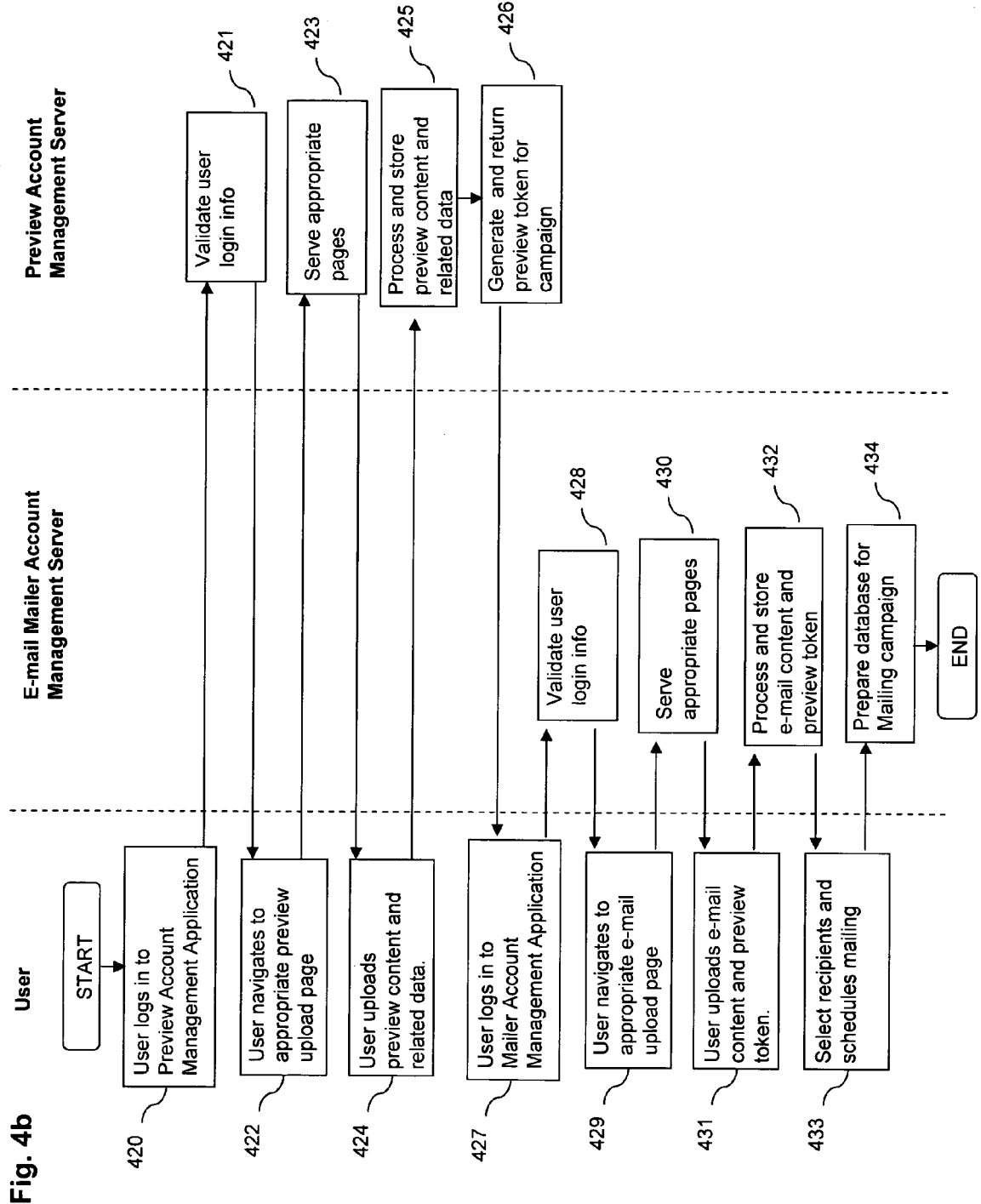

FIG. 4b illustrates a method where the user logs on at 420 to the preview account management application and is validated at 421, navigates at 422 to the appropriate interface to upload or manage the preview content, and the application serves at 423 the appropriate interface as web-pages.

The user then fills in the interface with the appropriate preview information including using the interface to upload the preview content. The preview information may include the type of the content such as jpeg, gif or Macromedia Flash, a title as well as the destination URL that the e-mail recipient should be sent to should the recipient click on the content within the preview window. The user then submits the data at 424 to the preview account management server.

The preview account management server then processes the submission and preferably stores the content within a database at 425. This content is then made available to the e-mail preview server 13. A preview token is then generated and sent back 426 to the user. This token uniquely identifies the preview content and the application serves at 430 the appropriate interface as web-pages.

The user then logs on at 427 to the mailer account management application, and the application validates the user credentials at 428. The user then navigates at 429 to the interface to upload and manage e-mail content.

The user may then fill in the interface with the appropriate e-mail information including using the interface to upload any e-mail content and entering the e-mail preview token retrieved in step 426. The user then submits the data to the mailer account management server at 431.

The e-mail account management server then processes the submission and preferably stores the content within a database at 432. The user then selects at 433 the recipients of the e-mail from the interface, and sends the selection to the server. The mailer account management application then prepares the e-mail for the sending process at 434.

Figure 4C:
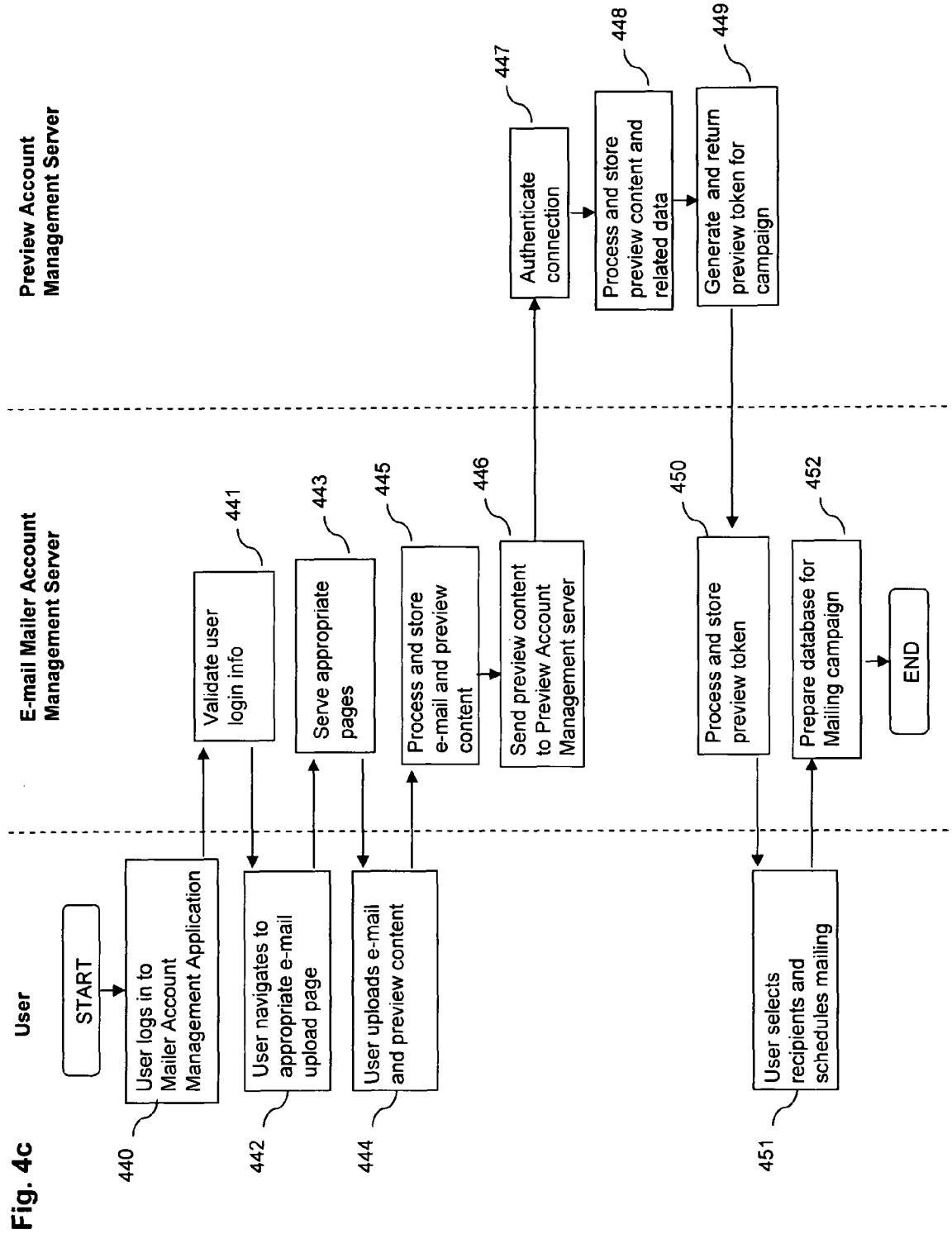

FIG. 4c illustrates a second method where the user is only required to log onto a single interface to create and launch the campaign without having to use two separate interfaces. As shown, the user logs on at 440 to the mailer account management application, and the application validates the user credentials at 441. The user then navigates at 442 to the interface to upload and manage e-mail content as well as the preview content. The user then submits the data to the mailer account management server at 444. The application processes and preferably stores the e-mail content as well as the preview content in a database at 445. The application then communicates at 446 with the preview account management application using a network connection and sends the preview information over. In a preferred embodiment, this connection uses the XML based SOAP (Simple Object Access Protocol) protocol and authenticates by passing the user's identity and authentication credentials along with the preview content.

The preview account management application authenticates the connection at 447 to ensure that the mailer account management application is allowed to interact with the application, and then processes and stores the information at 448, preferably into a database. The application then generates a unique preview token at 449 that gets sent back to the mailer account management application, whereupon the token is stored at 450. The user may then select at 451 the recipients of the e-mail from the interface and send the selection to the server. The mailer account management application then prepares the e-mail for the sending process at 452.

In both FIGS. 4b and 4c, the preview token may uniquely identify the preview content. This token may be used as part of the preview instructions or it may be the complete preview instruction. In an alternate embodiment of the invention, the preview token may be generated by the mailer account management application and sent to the preview account management application.

Preferably, the preview instructions contain authentication information, as will be described, to allow the web-based e-mail provider to identify the preview server, and to allow a preview server to identify the vendor which sent the e-mail. When the preview is uploaded, a preview instruction generator routine may be invoked to generate the preview instructions to embed into the e-mail headers. The routine to generate the preview instruction may reside on the e-mail sending application (sender's mail user agent or mail transfer agent) end or at a third party, such as the location of the preview server. The preview instruction allows the recipient's e-mail system to generate, retrieve and display the necessary preview content related to the e-mail. The preview instruction may be inserted into the e-mail during the e-mail sending process.

In addition to generating the preview instructions, the preview instruction generator may apply an encryption algorithm to protect or obfuscate the instructions. This encryption may be in a form of DES, Blowfish or any of a plurality of other known schemes. In addition to encrypting the e-mail instructions, if a hash or digital signature of the e-mail is generated, the digital signature may also be included in the encrypted content to further protect the e-mail from being spoofed.

Preferably, a separate authentication injector application is utilized. This application inspects all outbound e-mail traffic out of a private network into the public Internet or another private network. The authentication routine detects e-mails with preview instructions, and may apply one or more of a plurality of authentication schemes to the e-mail.

Detailed Mailing Process

Figure 4D:
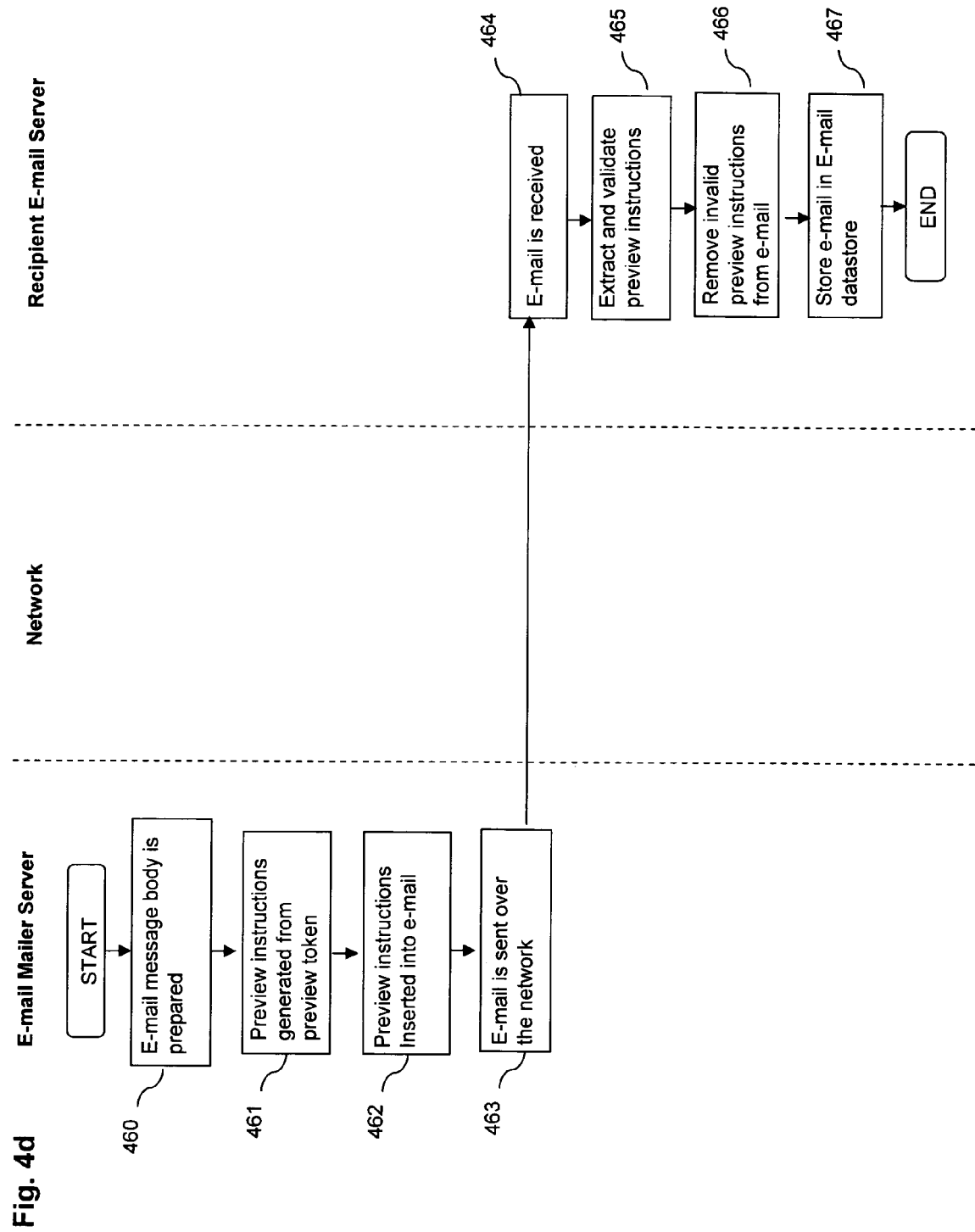

FIG. 4d illustrates in more detail the processes shown in 403 and 404 of FIG. 4a. FIG. 4d also illustrates the process of sending an e-mail that has a plurality of associated preview contents. The process begins at 460 where the body of the e-mail is prepared using contents of the e-mail retrieved from the database. The preview instructions may be then generated at 461 based on identifiers of the preview content created during the upload of the preview content to the preview server. The preview instructions may be then inserted at 462 into the header of the e-mail, and the e-mail sent at 463 to a recipient over the network, using for example the SMTP protocol, or queued in a mail queue to be sent by another mail transfer agent. The e-mail may then travel through other mail servers (MTA) in transit to the recipient e-mail server.

When the e-mail is received by the recipient's e-mail server (MTA) at 464, the e-mail header is inspected for preview instructions and if the instructions exist, the instructions may be extracted and validated at 465. If the instructions are deemed to be invalid, the instructions are removed at 466 from the e-mail. The e-mail is then stored at 467 in the e-mail data store.

It is advantageous to apply security, authentication and auditing schemes to the mailing process to ensure that the preview instructions and/or e-mail content have not been tampered with during transit to verify the integrity of the e-mail, and to authenticate the identity of the senders of e-mail containing the preview instructions to provide assurances to recipients that senders are who they say they are, as well as to afford the ability to charge senders of and track preview enhanced e-mails.

At step 461, a digital signature may be generated using a hash of parts of the e-mail content including parts of the preview instructions, and the digital signature may be further encrypted to form a secure cryptographic token that can be validated at the recipient's end to ensure that the e-mail has not been tampered with. The cryptographic token may also contain an identifier to uniquely identify this particular instance of an e-mail, as well as to identify the preview instruction for auditing purposes since there may be different billing structures for different types of preview content. Preferably, the body of the email along with the preview instruction is hashed into the digital signature.

At step 465, the cryptographic token may be extracted, decrypted and validated to ensure that the e-mail has not been tampered with. In the preferred embodiment, the invention preferably uses a "public key encryption scheme such as Pretty Good Privacy (PGP) using private/public-key pair, where the digital signature and cryptographic token are created using a private key and the verification uses an available public key to decrypt and verify the e-mail contents. Processes of verification of an e-mail using an encrypted digital signature are familiar to those skilled in the art and may be used. The encryption scheme may alternatively make use of a single private key that is known only to the authentication process. The invention may further determine the preview type, attach a unique identifier to the cryptographic token, and store this information for auditing and billing purposes.

In addition to validating the preview instructions, it is advantageous to include the IP address of the sending MTA with the preview instructions for validation. The validation routine can extract either the IP address from the "last hop" MTA address in the email header, or, in the case of validation being done at the MTA level, the IP address of the connected sending MTA.

The sending MTA referenced as the "last hop" MTA is the server that was responsible for delivering the message to the recipient MTA. ("Last hop" also may refer to the last MTA from an outside network that connects to an MTA within the network of the recipient's MTA.) A principal reason for using an IP address is to allow the validation routine to verify that the message was sent from an authorized source. The validation routine may check the IP address against a list of authorized IP addresses and, if the IP address does not appear in the list, to reply with a response that the instructions are invalid.

Integration with Third Party Authentication Systems

With the advent of e-mail authentication technologies that utilize embedding authentication tokens in e-mail headers such as DomainKeys and Goodmail's CertifiedEmail, it is becoming common to employ routines or servers that receive email content during or immediately after the e-mail sending process and apply authentication tokens, such as headers to the e-mail, as the e-mail is being sent to a recipient's e-mail server.

It is advantageous that the process that applies the authentication tokens be enhanced to analyze the e-mail for preview instructions and determine the type of the preview instructions as well as the validity of the instructions, and apply a special predetermined version of the authentication token to the e-mail. This allows a similar authentication routine at the recipient's end to easily determine if a preview was part of the e-mail, as well as determine the preview type without having to parse the preview instructions, and to store this information in a database for auditing purposes.

Generating the E-Mail listing

Figure 5:
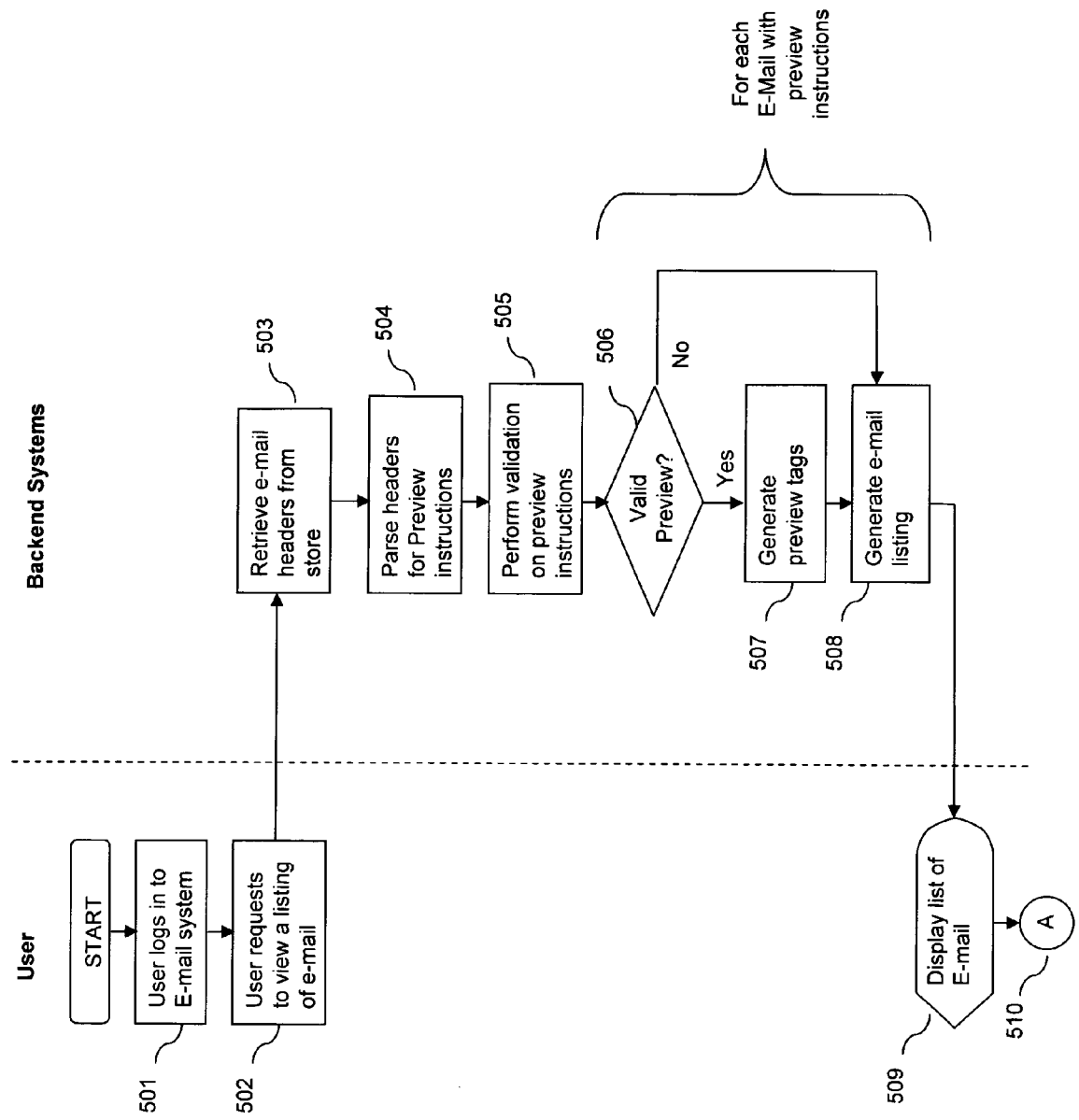
FIG. 5 shows an embodiment of a process of the invention for generating a listing of preview-able e-mails.

FIG. 5 illustrates a process by which the listing of preview-enabled e-mails may be generated. The process begins at 501 when a user logs into the web-based e-mail system, and the user clicks on a link at 502 to request a listing of his e-mails.

When the listing of e-mails is being generated, the preview client process integrated with the web-based e-mail application may issue a call at 503 to retrieve the e-mail headers and other summary information about the e-mails to generate an e-mail listing. This information may include, for example, the sender's name, e-mail subject, date, size of the e-mail, whether there are attachments as well as preview instructions, if present, in the header. The backend system comprises the components in FIG. 1b on the web mail server 100, and, optionally, the preview server 108.

The aggregate information of the e-mail listing may be then parsed at 504 for preview instructions. If the e-mail contains preview instructions, then a validation routine may be performed at 505 on the preview instructions. A validation routine can check at 506 to ensure that the preview server serving the preview is a trusted partner of the web-based e-mail provider, and that the web-based e-mail system has the capabilities to serve the preview.

If the e-mail contains valid preview instructions, then the necessary preview triggering information 203 may be included in the e-mail entry 202 in the listing 201. As previously explained, the preview trigger is not limited solely to an icon, but may comprise other mechanisms such as in a portion of or the entire e-mail line item. If the e-mail does not contain preview instructions, or if the preview instructions are not valid, then the listing of the e-mail is generated without the preview triggering information 204.

Where the preview trigger comprises an icon 203, the preview triggering information may be appended to the icon of the e-mail entry and provide appropriate "on MouseOver" and "on MouseOut" JavaScript instructions to trigger the preview when the user moves his mouse over the icon. A hidden HTML layer may be created for each of the entries to display the preview content when the user activates the triggering mechanism. This can be achieved using the <DIV></DIV> tags and setting the position style variable to "absolute" and visibility style variable to "hidden". When the trigger is actuated, the visibility variable is reset to "visible", thus showing the hidden preview content. Alternatively, one hidden HTML layer that is shared between different previews may be used. Other methods to achieve an overlay or sliding out transition effect may also be used. After all the e-mail entries have been generated, the complete e-mail listing may be displayed to the user as indicated at 509 in FIG. 5.

At step 507, the application generating the e-mail listing may parse the preview instructions and create the necessary mechanisms and triggers to allow the user to activate the preview mechanism. Alternatively, a third party script call may achieve this effect. The application generating the e-mail listing may output a script call, e.g., "genPreview(<teaser instructions>)", which is a JavaScript call. The genPreview function may be defined in a separate JavaScript file that is downloaded from another server. This script file generates the necessary mechanisms to display and activate the preview. If an icon is used as the preview trigger, this function may generate the necessary HTML (or DOM) to display the icon. If the subject line is used as the preview mechanism, the subject line's on MouseOver and on MouseOut event handlers will be set to activate and deactivate the preview mechanism.

A "just-in-time" approach may be used to generate the preview window. During step 507, a script instruction (JavaScript) may be generated that partially initializes the state of the preview, including creating the preview triggering mechanisms. However, the preview window/layer may not be created or populated until the user activates the preview trigger itself 601.

In order to attract the attention of the e-mail recipient to the preview triggering mechanism, a visual hint may be used. The visual hint may be an arrow that points to the preview triggering mechanism or a word such as "mouseover" that appears close to the preview triggering mechanism. In a preferred embodiment, the hint only appears for a short period, e.g., five seconds, and only appears when the e-mail is new and/or unread.

Alternatively, the first preview window in a list of preview windows may automatically display for a few seconds and then hide to draw the user's attention to the fact that an e-mail contains preview content.

Activating the Preview

Figure 6:
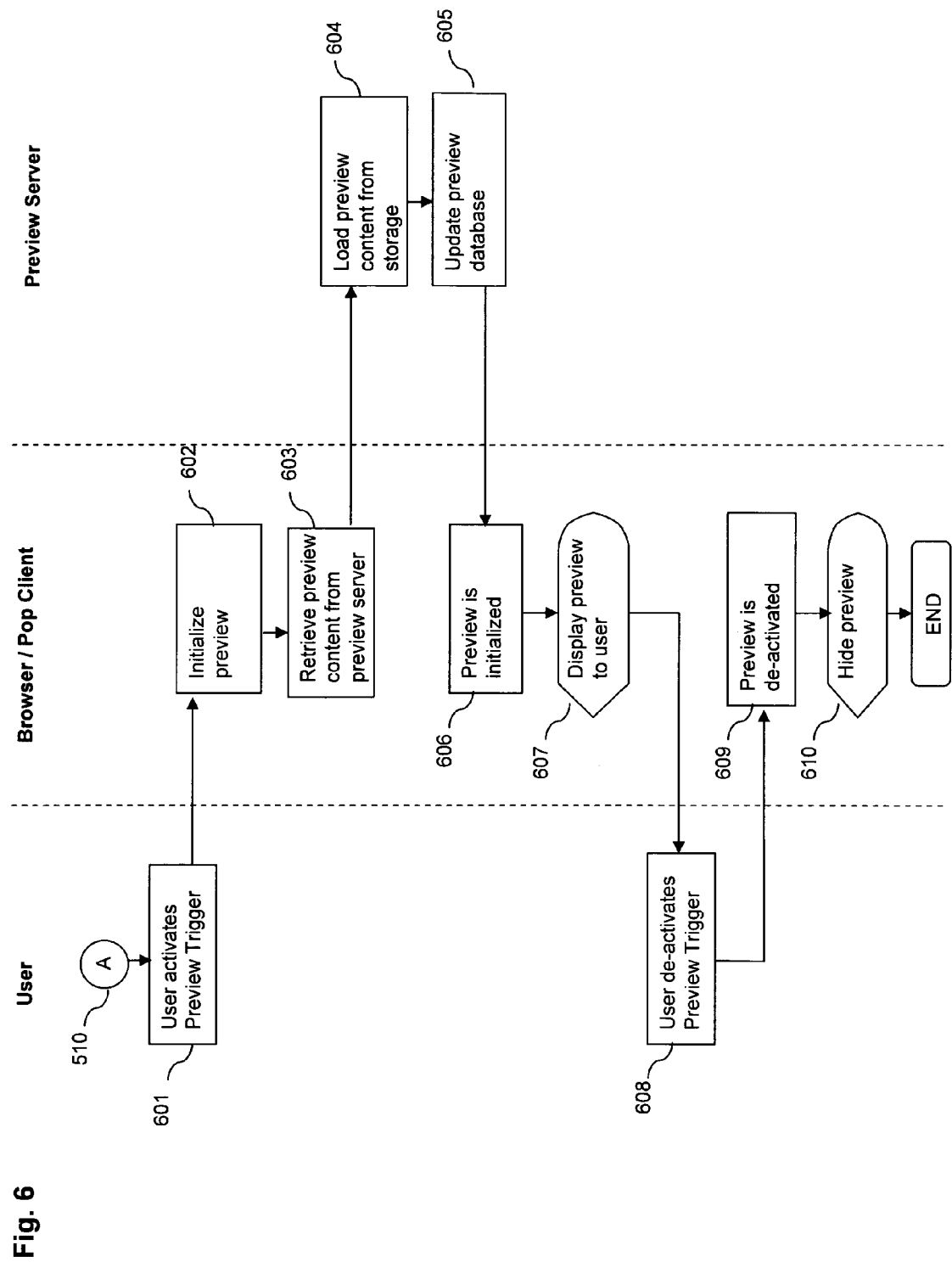
FIG. 6 shows an embodiment of a process of the invention for retrieving a preview from the preview server and displaying it to a user.
Figure 8A:
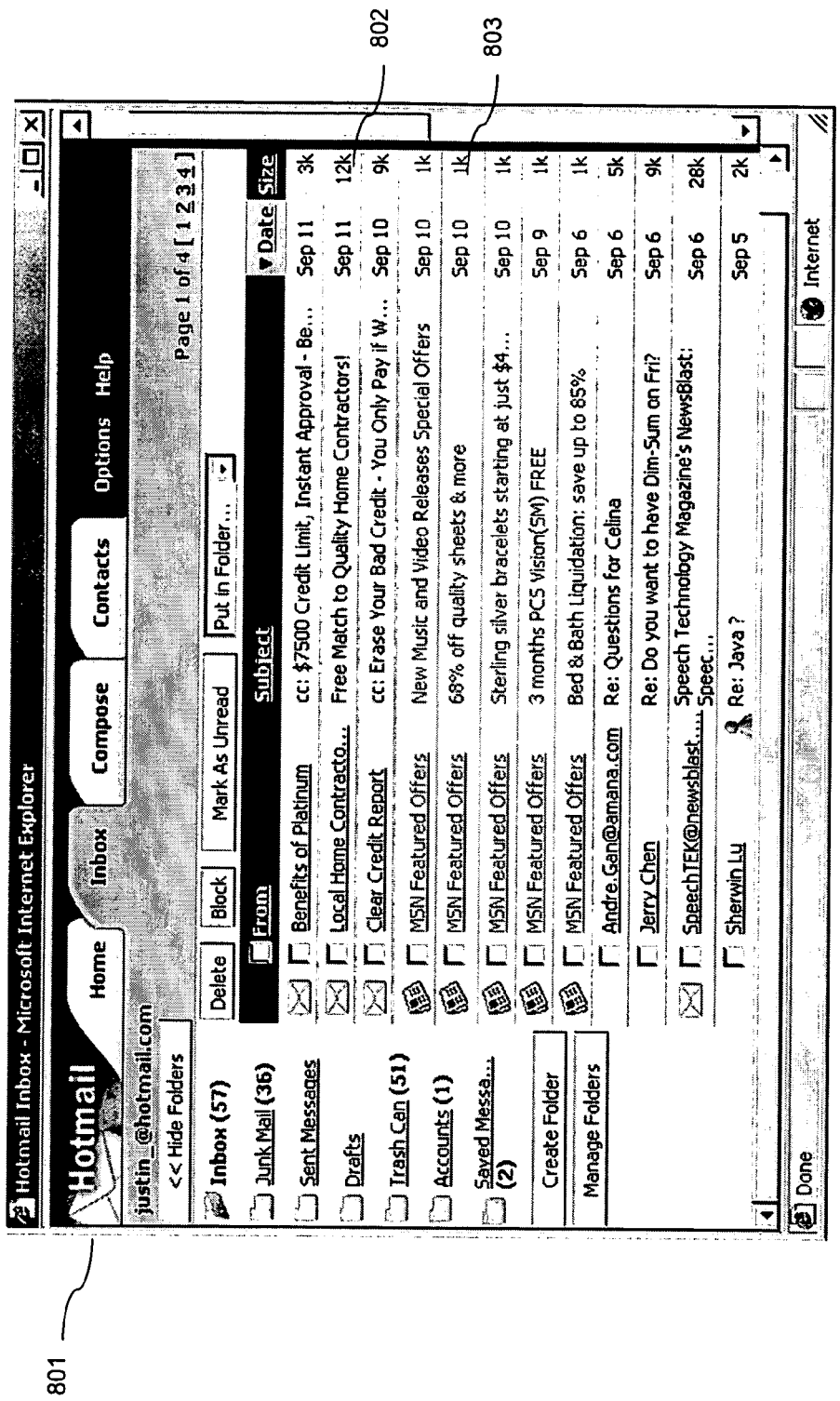
FIGS. 8a and 8b show examples of prior art implementations of non-promotional e-mail delivered to users within a web-based e-mail provider's system.
Figure 8B:
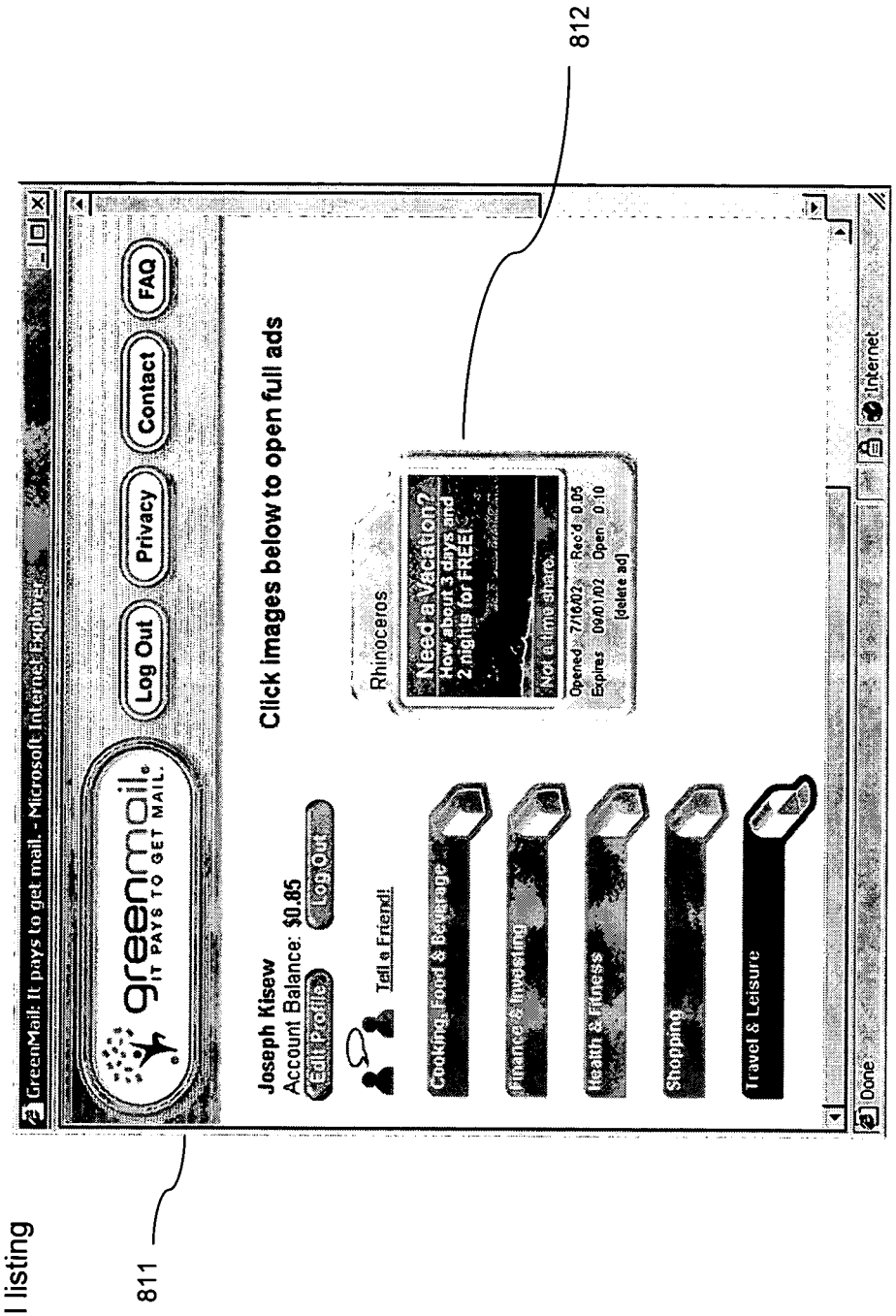
Figure 8C:
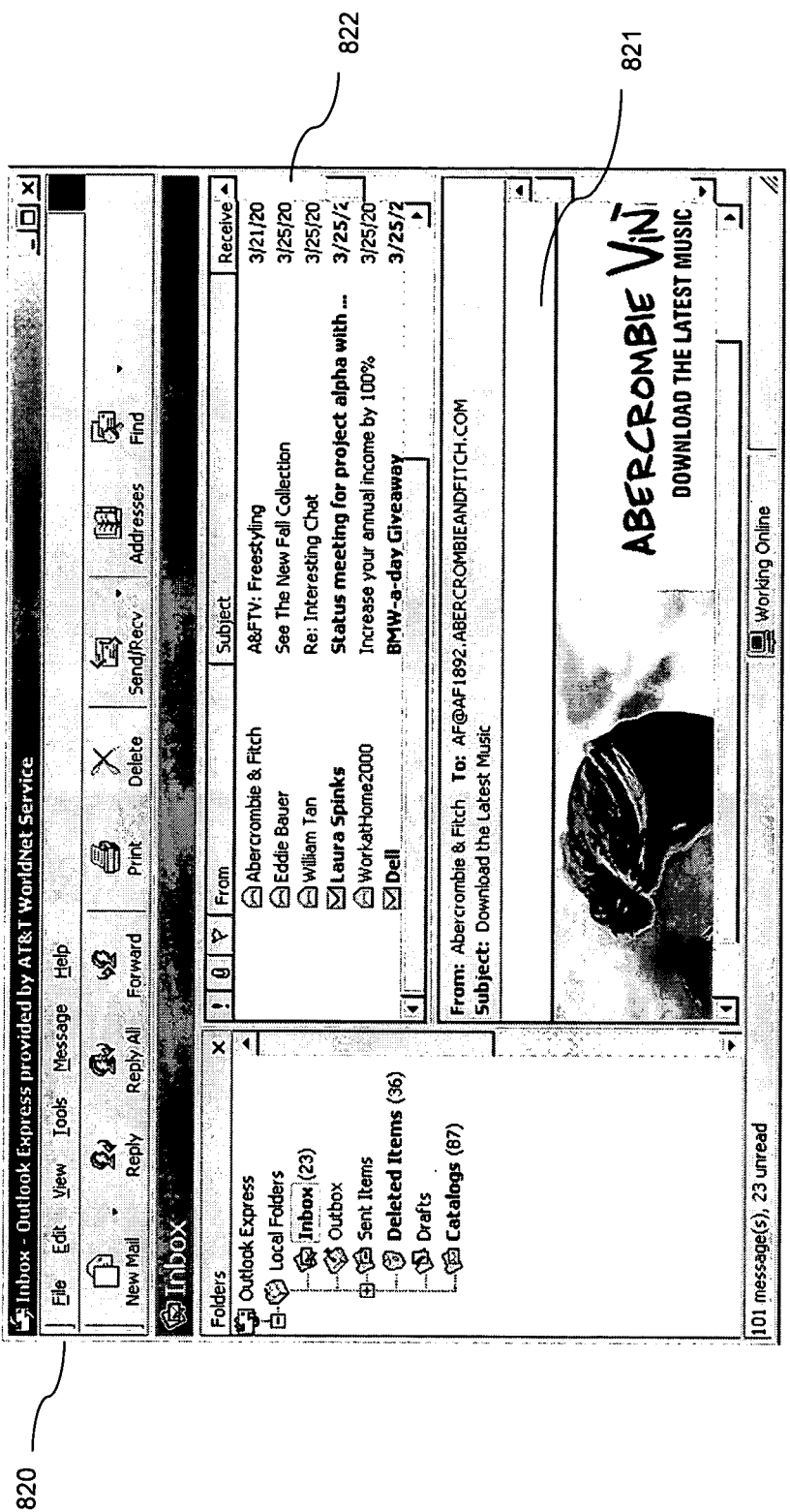
FIG. 8c shows a Microsoft Outlook implementation of a preview window.

FIG. 6 illustrates the process where the user activates the preview trigger in a preview listing. After the user has logged on and a list of e-mails that has been displayed to the user at 509, the user may move his mouse over a triggering icon to activate the preview trigger, as shown in FIG. 6 at 601. This will cause a script process running on the user's client application, e.g., a browser, to initialize the preview at 602. The routine may then make a HTTP call to retrieve the preview content at 603 from the preview server. Upon receiving a call from the browser, the preview server process examines the parameters of the HTTP call from the browser to determine the authenticity of the request, the unique code of the preview, as well as the identity of the web-based e-mail provider which is hosting the e-mail. The content of the preview may be then loaded from the preview storage at 604. The preview database may be then updated at 605 to reflect the transaction, and the preview content is sent to the browser through the HTTP connection.

The preview process on the browser may perform initialization routines at 606. This can include passing parameters to a Macromedia Flash or Java applet based preview content. Once the preview content has finished initializing, the preview may be displayed to the user at 607. The preview may preferably be animated so that it appears to slide out from under the e-mail listing, for example, as previously described. This can be done by noting the position of the triggering icon and positioning the preview layer under the icon. The sliding-out transition effect may be achieved by placing a visible layer containing the preview content within a transparent layer, and setting the transparent layer's overflow style attribute to "hidden". When the trigger is triggered, the transparent layer is positioned below the triggering mechanism, whereas the visible layer containing the preview content is positioned above the transparent layer, thus making the preview content initially "hidden" as the content is outside the boundaries of the transparent layer. A routine can be then performed where the preview content layer is gradually repositioned downwards until it fits exactly inside the transparent layer, giving the impression of the preview content sliding down from under the selected e-mail line. This process may be accomplished using JavaScript.

Other forms of preview animation may also be used, including using the transparent effects of Macromedia Flash or other technologies borrowed from the online advertising "banner" industry, such as employed by Eyeblaster and PointRoll. The preview may also be an animation that appears across the browser window instead of in a fixed position under the e-mail listing. A preview may additionally appear in a fixed position on the application or browser window.

After the user has viewed the preview, the user may deactivate it (at 608) by moving the mouse cursor away from the preview trigger. This can initiate an "on MouseOut" routine that will deactivate at 609 and hide the preview at 610.

The preview window may be configured so that clicking on the content within the preview window may either open the e-mail content, open a new window with a URL associated with the preview content or fetch new content within the preview window.

The preview window functionality may also involve other possible embodiments. For example, instead of a layer that overlays the listing of emails in an inbox, the preview window may consist of "pushing down" the email entries below the email entry that is active and displaying the content of the preview adjacent to the bottom of the active email entry. This method has the advantage that the preview window does not obstruct any of the emails but has the disadvantage of causing the moving of the entries below the active email which may be less visually appealing. On a web-based email system, this preview mechanism can be achieved by having each email entry be displayed in an HTML table row and when a preview is activated, inserting a row under the active email entry and displaying the preview content in a <DIV> within that new row. This mechanism will make the email entries below the active email be pushed down while the preview window takes up the space beneath the active email entry. On a desktop client, this can be achieved using a mechanism similar to that described above but using different components such as using a DataGrid in VisualBasic.

Verification, Validation and Revocation

Returning to FIG. 4a, verification may be performed at a several points in the process. Verification of e-mails containing preview enhanced messages can be performed when the message reaches the recipient's mail server (MTA) at step 405. The message may be parsed to determine if it contains a preview instruction. If so, the instruction may be validated for authenticity. If the validation succeeds, the e-mail may be stored and, optionally, a flag may be set in the data store to mark the e-mail as preview enhanced. If the validation fails, the e-mail may be discarded or the preview instruction may be redacted from the e-mail.

Verification of e-mails containing preview enhanced messages may also take place when the recipient's inbox is being generated for display. When parsing the messages for the generation of the list of e-mails at step 407, the routine that parses the e-mail may contact an application to verify the authenticity of any preview instructions before generating the necessary preview mechanism for an e-mail.

In addition to validating instructions, it is advantageous to validate the IP address of the sending MTA be used with the preview instructions. The validation routine may either extract the IP address from the "last hop" MTA address in the e-mail header, or, where validation is done at the MTA level, from the IP address of the connected sending MTA.

The sending "last hop" MTA is the server that was responsible for delivering the message to the recipient MTA. (The last hop also may refer to the last MTA from an outside network that connects to an MTA within the network of the recipient's MTA). An IP address can be used to allow the validation routine to determine if the message sent was from an authorized source. The validation routine may check the IP address against a list of authorized IP addresses, and if the IP address does not appear in the list, a response may be sent that the instructions are invalid.

As may be appreciated, the verification can take place at any time after the e-mail has been received at the recipient's MTA server. The routine that validates the preview instruction may reside on the MTA or a server within the local network of that MTA. However, it is advantageous for the validation to occur at the server that generates the preview instructions, or at a third party, especially if the instructions are encrypted or protected. This allows a central party to store the encryption keys. The validation routine at the recipient's e-mail server then merely needs to pass the instructions (or encrypted instructions) to the validation server. Should the instructions be encrypted, the validation server's response may contain additional decrypted instructions that can be used to generate the preview mechanism when the user views the e-mail inbox listing.

Validation During List Generation/Display

FIG. 5 illustrates a process that is executed to validate at 505 the preview instructions. At that point the process may contact a remote server to check whether the preview instructions are still valid. This process will, however, tax the server application since it will have to perform a network call for each e-mail that is displayed. A more advantageous scheme would be to allow the validation process be done after the e-mail listing is generated at 508.

It is also advantageous to be able to revoke preview instructions or content in e-mail that has already been received and validated at the recipient's e-mail system, because certain legitimate e-mail promotions may be cancelled or e-mails of certain senders may be incorrectly identified as SPAM. Preferably, the preview mechanism is not shown to the e-mail recipient should a preview server be unavailable, since triggering the preview display mechanism would result in displaying an error or non-existent content.

In order to support revocation or "on-the-fly" validity checking, a plurality of different mechanisms may be used. For example, a trusted third party application may notify an application on the recipient mail system that e-mails containing certain instructions are no longer valid, and the recipient system may either delete the messages containing the invalidated instructions from the data store or it may store the IDs of the invalidated preview content in a data store to compare against when checking whether to generate the preview mechanism (as shown in FIG. 5, step 506).

Another approach is to contact the preview server to validate the preview instructions when generating the listing of e-mails (at step 504) to display to the user. If the preview server invalidates the preview instructions, or if the preview server is not available, the preview mechanism will not be enabled for the e-mail.

Further, where an e-mail is read in a web-based environment, the validation can be performed by the browser. The e-mail application that generates the preview mechanisms for all the e-mails with preview instructions embedded may initially disable the preview mechanisms. If the preview trigger is an icon, the icon may be hidden. The application may send to the browser a set of instructions, preferably in JavaScript, that instruct the browser to make a script call to the preview server to verify that the preview is valid. The previews that have been validated may be enabled, and preview triggers in the form of icons can be displayed to the user.

For example, when the e-mail listing is generated, the preview mechanisms may be set to "false" by invoking custom JavaScript routines in the page (for example preview codes AG5000 and EB9000) as follows:

```
<script>
    setPreviewDisabled(AG5000);
    setPreviewDisabled(ED9000);
    validateWithServer(AG 5000);
    validateWithServer(ED 9000);
</script>
```

The setPreviewDisabled( ) script merely sets a flag to denote that the preview associated with the particular code has not been validated. The validateWithServer( ) script will instruct the browser to validate with the preview server by sending the preview codes to the server. The implementation to connect with the preview server asynchronously may be implemented with a JavaScript XMLHttpRequest( ) call, by loading the page from the preview server using a separate frame, or by generating a <script> tag within the page dynamically by manipulating the Document Object Model (DOM) of the page displaying the e-mail listing, and referring the source of the script to a URL that resides on the preview validation server. Since the XMLHttpRequest( ) generally only allows connections to servers that are of the same domain as the web mail application, the preferred embodiment may use a script tag generation method such as:

```
var script=document.createElement('SCRIPT')
script.src=http://validationserver.com?action=isactive&cids=-
AG5000+EB9000
```

The new <script> element can then be appended to an existing element within the window. This process will execute the new script call and send a request to the preview validation server.

The preview validation server may then determine whether a preview is still valid, and, should it still be valid, output a set of scripts such as the following that can be parsed and executed to instruct the browser to enable the preview mechanism, which may enable a mouse-over mechanism and display any hidden icons:

```
setPreviewEnabled(AG5000);
setPreviewEnabled(EB9000);
```

It is also desirable to append other verification information to the validation calls to the validation server, such as e-mail sender's IP address, the digital signature of the e-mail message, or other information associated with the e-mail. This allows the validation server to better judge the validity of the e-mail containing the preview instructions as well as allowing the validation application to track and log e-mails that have been displayed to the user. Other mechanisms that allow a browser to connect asynchronously to a remote server may also be used to perform validations.

An additional benefit of on-the-fly validation is that it allows the preview server to dynamically change the instructions of the e-mail and display different content at different times.

Tracking

It is advantageous to track whether the recipient of an e-mail has viewed the preview content. Tracking the loading of preview content from the preview teaser may be insufficient since often the e-mail user interface may preload the content.

One method to enable the tracking of the triggering and display of the preview window is to embed a small hidden tracker graphic within the e-mail listing window, i.e.,

```
<img name="tracker_img" src="http://local_server.com/blank.gif"
height=1 width=1>
```

When the user triggers a preview window, the tracker graphic's "src" can be replaced by a new src from the preview server. The URL of the src may be keyed to the particular preview content being displayed as shown below.

```
<script>
function report_tracking(preview_id, action,recipient){
    var tracking_url = "http://tracker_server.com/track.jsp?"
    tracking_url + ="preview_id="+preview_id+"&action="+action
tracking url +="&recipient="+recipient;
document.images.tracker_img.src = tracking_url;
}
</script>
```

The preview server when receiving the request from the user's browser to serve up the image will parse the parameters of the URL for the preview identifier, the action that the user has taken, and optionally the recipient identifier. The preview server then records this information in a database (FIG. 7) that can be then Used by another application to count the number of times a user has viewed the preview. The preview server then redirects the request to load a picture of a transparent image. Actions that can be tracked in this manner include the initial loading of preview content (before the trigger is activated), the triggering of the preview window and the user clicking on content within the preview window or the preview trigger.

In addition to such graphic "beacons", other methods may also be used. For example, an XMLHttpRequest JavaScript asynchronous call to the server can be used or a call to the server upon dynamically loading a "script" file.

Other than tracking the triggering of preview windows, this mechanism can also be used to track preview content that has been loaded by the browser or user interaction with elements within the preview window.

Dynamic Pre-Loading of Preview Content

In cases where there are preview enhanced e-mails in an inbox, particularly in a web-based inbox, the simultaneous loading of this content in the background may slow down the loading of the inbox in general. Therefore, methods of dynamically loading this content are preferable. The following approaches are especially preferable and applicable to a web-based inbox:

Load Preview content only after the page has finished loading (triggered by the Body on Load event)

For images, loading content in the background by loading all images as "empty" or a default image and having JavaScript load each image subsequently by setting the on Load event of an image to load the next image.

For Flash, Java or other more complex applications, a central "loader" application may be used to load this content dynamically. For example, it is common for websites to employ Flash loaders to show visitors that the content is currently "loading". In this scenario, a Flash loader may be used to load all the content in the viewable inbox dynamically, e.g., sequentially, so that multiple Flash teasers do not compete for bandwidth. JavaScript can also be used to coordinate multiple loaders, especially if they use different technologies. The methods allowing JavaScript to communicate with plug-in applications such as Flash and Java Applets are well known.

The preview content loaded by teasers is not restricted to graphical introductions. It may contain text, mini movies, mini-games, even interactive elements such as Instant messaging chats. Various processes for embedding content into web-pages and desktop applications are well known and may be employed in the invention.

Database Tables

FIGS. 7a, 7b, 7c and 7d illustrate simplified relational database tables preferably stored within the preview server's database storage. As shown, the "PREVIEW_TABLE" (FIG. 7a) contains information about each preview stored on the preview server. Each preview is identified internally with a Preview_ID and identified externally with a Tracking_Code. Each preview may also be tied to a vendor which is represented by the Vendor_ID.

The "TRANSACTION TABLE" (FIG. 7b) contains a record of each preview served. Examples of transactions tracked may include preview enhanced email sent, preview enhanced email received, preview content loaded by the recipient and preview window displayed at the recipient. The field "Recipient_E-mail_Addr" identifies the recipient of the e-mail that retrieved the preview, and the field "Affiliate_ID" refers to the web-based e-mail provider hosting the e-mail account of the recipient. In the preferred embodiment of the invention, the affiliate web-based e-mail provider may receive a cut of the revenue from each transaction or preview served. Alternatives to using the user's e-mail address in the "Recipient_E-mail_Addr" field are to use a unique token or to encrypt or hash the e-mail with the vendor's private key to protect the e-mail recipient's privacy.

The "AFFILIATE_TABLE" (FIG. 7c) contains a record of each affiliate of the preview serving company. The affiliate may be a web-based e-mail provider, like Hotmail and Yahoo! Mail, an ISP such as AOL, or any other business hosting preview enabled e-mail accounts for users.

The "VENDOR_TABLE" (FIG. 7d) contains a record of each customer of the preview serving company who uses the preview serving company's preview servers to provide e-mail previews. The vendor may be the sender, the advertising agency of the sender, or another third party.

RSS and Pull-Based Messaging

The invention can also be applied to pull-based messaging such as RSS (Rich Site Summary). RSS started out as a method to syndicate news and content. However, RSS is quickly becoming accepted as a method to notify customers of the availability of new products or sales specials. Unlike e-mail messages that are automatically sent to recipients, RSS customers use RSS readers to query an RSS server for updated content or electronic messages.

The invention as described herein may be applied to RSS electronic messaging by adding an extra tag in an RSS format (there are multiple competing RSS formats). For example the preview instructions may be encapsulated in <x-preview></x-preview> as follows:

```
XML tags
le:
<?xml version="1.0" encoding="utf-8" ?>
<rss version="0.91">
<channel>
  <title>Amazon.com's Apparel specials</title>
  <link>http://www.amazon.com/apparel_rss?id=afkjghfa7g
  bgai4glkaga47</link>
  <description>Amazon apparel</description>
<language>en-us</language>
<pubDate>Tue, 10 Jun 2003 04:00:00 GMT</pubDate>
<lastBuildDate>Tue, 10 Jun 2003 09:41:01 GMT</lastBuildDate>
<item>
  <title>New fall sweaters</title>
  <x-preview version="2.0">
  <url>URL=http://previewserver.com/getpreview?-
  preview_code=A3123G11</url>
    <type>MacromediaFlash6.0</type>
    <width>480</width><height>200</height>
  </x-preview>
  <link>http://www.amazon.com/apparel?id=sweaters</link>
  <description>Visit the apparel section for the newest sweaters in
stock!</description>
  <pubDate>Tue, 03 Jun 2006 09:39:21 GMT</pubDate>
</item>
<item>
  <title>Nike Air</title>
  <x-preview version="2.0">
  <url>URL=http://previewserver.com/getpreview?preview_code=
  BGDAD1
    </url>
   <type>MacromediaFlash6.0</type>
   <width>480</width><height>200</height>
  </x-preview>
  <link>http://www.amazon.com/apparel?id=nike_air</link>
  <description>See the newest Nike shoes</description>
  <pubDate>Tue, 03 Jun 2003 09:39:21 GMT</pubDate>
</item>
</channel>
</rss>
```

RSS readers that encounter preview instructions may validate the preview instructions against a preview server before displaying preview triggering mechanisms, and allow the user to mouse-over the mechanism to display the preview.

In other embodiments, the invention may employ a preview window generated by a browser plug-in, as where the browser contains a special plug-in that natively displays previews without the need for the preview to be generated by JavaScript or the server.

In another embodiment, the preview mechanism may allow a browser plug-in to create the preview triggering and preview layers. This utilizes a browser that has been enhanced with the preview technology to detect that a listing of messages on a webpage contains preview-able messages. The browser may then render the previewing mechanism either natively or by altering the webpage with the listing of messages. For example, the server may output a tag that is understood by the browser or a plug-in installed by the browser to generate the preview content, such as:

```
<xpreview url="http://server.jsp?preview=555&recipient=julie@foo.com"
type= "flash" width="350" height="100" version="1.0" />
```

The invention may cause the browser to generate an icon in place of the tag, so that when the user hovers over the icon it would create a preview window and display the content within it.

Sending Preview Instructions Using An Alternative Mechanism (SMTP)

Another way to embed the preview instructions is to pass the preview instructions using an SMTP instruction during the transmission of an e-mail message, instead of adding the instructions into the header or body of the message. An example of an SMTP conversation between a sender machine and a recipient machine may look like the following:

```
SENDER:    helo sender.com
RECIPIENT: 250 host.et02.net Hello foo.com [192.196.225.101]
SENDER:    mail from: offers@sender.com
RECIPIENT: 250 OK
SENDER:    rcpt to: julie@recipient.com
RECIPIENT: 250 Accepted
SENDER:    data
RECIPIENT: 354 Enter message, ending with "." on a line by itself
SENDER: < sender sends the message content >
SENDER:    .
RECIPIENT: 250 OK id=1FPrgU-00026E-5q
```

An example of an SMTP conversation between a sender machine and a recipient machine with an additional "attached preview" (attach preview) instruction may look like:

```
SENDER:    helo sender.com
RECIPIENT: 250 host.et02.net Hello foo.com [192.196.225.101]
SENDER:    mail from: offers@sender.com
RECIPIENT: 250 OK
SENDER:    rcpt to: julie@recipient.com
RECIPIENT: 250 Accepted
SENDER:    attach preview: server preview_server.com cid 123432
type image width 300 height 100 ver 1.0
RECIPIENT: 250 Verified
SENDER:    data
RECIPIENT: 354 Enter message, ending with "." on a line by itself
SENDER: < sender sends the message content >
SENDER:    .
RECIPIENT: 250 OK id=1FPrgU-00026E-5q
```

From the above SMTP conversation, it can be seen that the "attach preview" line contains the URL and campaign ID (cid) which the recipient system will use to interpret and retrieve the type and dimensions of the preview content from a plurality of preview servers. It will be appreciated that these protocol enhancements can be applied to other areas of e-mail transmissions such as POP and IMAP. Moreover, in lieu of sending the preview instructions, the mechanism may send the complete preview content during the attach preview instruction call using the keyword "data":

```
SENDER:    attach preview: data
RECIPIENT: 355 Start preview input; ending with "." on a line by itself
SENDER: < sender sends the preview content >
SENDER:    .
RECIPIENT: 250 OK
```

While the foregoing has been with reference to preferred embodiments, it will be apparent, that changes may be made to these embodiments without departing from the principles and spirit of the invention, the scope of which is determined by the appended claims.

For example, the preview mechanism may be integrated into non-web based e-mail providers. It may be integrated into a proprietary e-mail interface, such as AOL, or it may be integrated into Outlook as an ActiveX plug-in.

The preview mechanism may also be integrated into e-mail applications designed for mobile devices, such as cellular phones and PDAs. A vendor that sends out the e-mail may be an e-mail service provider operating on behalf of one or more businesses.

The preview components may be configured and deployed in different ways. For example, the applications shown in FIG. 1b running on a web mail server 100 may be physically deployed on multiple different but connected servers. In another embodiment, the preview server may be physically located within and hosted by the web mail server's network. In yet another embodiment, the preview storage may be on a distributed caching network, such as Akamai's network.

Where dynamic user-triggered preview elements are concerned, the invention may also be applied to cases where the message is not technically an e-mail message at all, but rather a message that appears within an aggregate of messages. An example is where marketing promotions are placed directly within a web-mail user's inbox without being formatted to standard e-mail specifications and without being routed through standard e-mail systems.

The invention may also apply to cases where the preview instructions and mechanisms are secured to protect them from fraud. This may include encrypting the instructions, using digital certificates, and applying other known fraud prevention mechanisms.

The invention claimed is:

1. A method of enhancing an electronic message in a message listing of a client application receiving electronic messages, the electronic messages having a message body containing message body content, the method comprising:
    incorporating into said electronic message one or more preview instructions for preview content, said preview instructions identifying said preview content for retrieval and display by the client application, the preview content comprising imagery that is descriptive of the subject matter of the message body content;
    associating by the client application a preview trigger with the electronic message on said message listing in response to said preview instructions;
    providing an identifier on said message listing to indicate that said electronic message has associated preview content; and
    displaying, upon actuating said preview trigger by a user, said preview content in accordance with said preview instructions within a preview window on said message listing.

2. The method of claim 1, wherein said electronic message comprises an e-mail message.

3. The method of claim 1, wherein said electronic message is transmitted using a Simple Mail Transfer Protocol.

4. The method of claim 2, wherein said preview content is generated separately from said e-mail message and is stored on a server, and said displaying preview content comprises retrieving said preview content from the server.

5. The method of claim 2, wherein said displaying preview content comprises retrieving said preview content from an attachment to said e-mail message.

6. The method of claim 2, wherein said displaying preview content comprises preloading the preview content prior to said actuation of the preview trigger.

7. The method of claim 2 further comprising validating the preview instructions, and inhibiting display of said preview content upon said preview instructions being invalid.

8. The method of claim 7, wherein said validating comprises validating the preview instructions after a request by said user for said message listing.

9. The method of claim 7, wherein said validating further comprises one or both of authenticating the identity of a sender of said message and the integrity of said message at a recipient.

10. The method of claim 7, wherein said validating is performed upon one or both of said e-mail message reaching a server of a recipient of said e-mail message, and generating of said message listing for display at said client application.

11. The method of claim 2 further comprising tracking said e-mail message to determine whether said associated preview trigger has been activated by said user.

12. The method of claim 2 further comprising tracking one or more of the number of times said preview content has been loaded and the number of times said user has clicked on said preview content.

13. The method of claim 2, wherein the preview content comprises one or more of an image, a rich-media application, audio and video, JavaScript and text.

14. The method of claim 2, wherein said preview window is opened temporarily on said message listing while said trigger is actuated adjacent an entry of said e-mail message on said message listing having said preview instructions.

15. The method of claim 2, wherein said preview instructions comprise instructions in a header of said e-mail message for retrieving said preview content.

16. The method of claim 15, wherein said preview instructions comprise a plurality of identifiers, and wherein said method further comprises retrieving preview content from a server using said identifiers.

17. The method for claim 2, wherein the preview instructions are associated with said e-mail message by a message server that originates e-mail messages.

18. The method of claim 2 further comprising enabling interacting with said preview content within said preview window to perform operations selected from the group consisting of opening the e-mail message, launching a web site in a browser, fetching additional content, and loading an object file.

19. The method of claim 18, wherein said interacting with said preview content comprises communicating with a server resident on a network.

20. The method of claim 2, wherein said displaying said preview content comprises loading the preview content to the client application using a predictive algorithm that loads preview content based upon one or more factors selected from the group consisting of priority of the preview content, size of the preview content, order of real-time triggering of the preview content, and proximity of unloaded preview content to previously loaded preview content.

21. The method of claim 20, wherein said loading comprises loading said preview content upon activation of the preview trigger.

22. The method of claim 2, wherein the preview trigger comprises a script that detects the cursor positioned at a predetermined location relative to one or more elements of the message entry.

23. The method of claim 2 further comprising deactivating display of the preview content upon a cursor moving away from one of the preview trigger, or the preview content, or after a predetermined time has elapsed.

24. The method of claim 2 further comprising authenticating said e-mail message before displaying said preview content.

25. The method of claim 24, wherein said authenticating comprises generating a digital signature with said preview instructions, and encrypting said digital signature.

26. The method of claim 24, wherein said authenticating comprises authenticating the identity of the sender of said message.

27. The method of claim 1, wherein said displaying preview content comprises obtaining preview content that is dynamically generated in real time from a server upon actuation of the preview trigger.

28. The method of claim 1 further comprising validating the preview instructions, and inhibiting display of said preview content upon said preview instructions being invalid.

29. The method of claim 1 further comprising tracking said message to determine whether said associated preview trigger has been activated by a recipient.

30. The method of claim 29, wherein said tracking further comprises tracking the number of times said preview content has been loaded.

31. A method of enhancing an e-mail message of an inbox listing of an e-mail client application, the method comprising:
    associating with said e-mail message, prior to the e-mail message being received by a receiving e-mail server, preview content comprising imagery that is descriptive of the subject matter of the e-mail message body;
    embedding prior to receipt by the receiving e-mail server one or more preview instructions within said e-mail message, said preview instructions identifying said preview content;
    generating a preview trigger in response to said preview instructions in said e-mail message;
    providing an identifier on said inbox listing to indicate that said electronic message has associated preview content; and
    displaying said preview content in accordance with the preview instructions upon actuation of said preview trigger by a user within a preview window on said inbox listing of e-mail messages.

32. The method of claim 31, wherein said displaying said preview content comprises opening said preview window temporarily on said inbox listing while said preview trigger remains actuated.

33. The method of claim 31 further comprising obtaining said preview content and said preview instructions from another server.

34. The method of claim 33, wherein said preview content is uploaded to the other server by a sender of said e-mail message, and wherein said associating said preview content and associating said preview instructions are performed by a sending server originating the e-mail message for the e-mail receiving application.

35. The method of claim 34, wherein said other server comprises a preview server for said preview content and said preview instructions, and the method further comprises supplying said preview instructions to said sending server originating said e-mail message for said e-mail receiving application.

36. The method of claim 31, wherein said associating said preview content with said e-mail message comprises providing said preview content as an attachment to said e-mail message.

37. The method of claim 31, wherein said associating said preview content with said e-mail message comprises associating an identifier that identifies said preview content with said e-mail message, and obtaining said preview content from another server using said identifier.

38. The method of claim 31 further comprising authenticating said e-mail message to authenticate the validity of said e-mail message and the identity of the sender of the e-mail.

39. A method of enhancing e-mail messages comprising:
uploading preview content to a server, said preview content comprising imagery that is descriptive of the subject matter of the e-mail message body content;
generating the e-mail message and one or more preview instructions for a recipient e-mail client, said preview instructions identifying said preview content for retrieval and display by said e-mail client;
associating in response to said preview instructions a preview trigger with said e-mail message on an inbox view listing of e-mail messages at said e-mail client;
providing an identifier on said inbox view listing to indicate that said e-mail message has associated preview content; and
displaying in accordance with said preview instructions, upon actuating said preview trigger, said preview content within a preview window on said inbox view listing.

40. The method of claim 39, wherein said generating, said associating, and sending of the email message are performed by one or more servers.

41. The method of claim 40, wherein said uploading comprises providing access to said servers by a content provider for managing said preview content.

42. The method of claim 31 further comprising validating the preview instructions prior to displaying the preview content.

43. The method of claim 31 further comprising tracking loading of said preview content.

44. The method of claim 31 further comprising tracking triggering of said preview content.

45. The method of claim 39, wherein said preview instructions comprise instructions in a header of said e-mail message for retrieving said preview content.

* * * * *